US011874206B2

(12) United States Patent
Pawliszyn et al.

(10) Patent No.: US 11,874,206 B2
(45) Date of Patent: Jan. 16, 2024

(54) DEVICE FOR EXTRACTING A MOLECULE OF INTEREST FROM A SAMPLE MATRIX, AND ASSOCIATED METHODS

(71) Applicant: JP SCIENTIFIC LIMITED, Waterloo (CA)

(72) Inventors: Janusz B. Pawliszyn, Waterloo (CA); Abir Khaled, Waterloo (CA)

(73) Assignee: JP SCIENTIFIC LIMITED, Waterloo (CA)

( * ) Notice: Subject to any disclaimer, the term of this patent is extended or adjusted under 35 U.S.C. 154(b) by 143 days.

(21) Appl. No.: 17/100,008

(22) Filed: Nov. 20, 2020

(65) Prior Publication Data

US 2021/0156767 A1 May 27, 2021

Related U.S. Application Data

(60) Provisional application No. 62/939,313, filed on Nov. 22, 2019.

(51) Int. Cl.
*G01N 1/04* (2006.01)
*H01J 49/04* (2006.01)
(Continued)

(52) U.S. Cl.
CPC ............. *G01N 1/04* (2013.01); *G01N 1/405* (2013.01); *H01J 49/0459* (2013.01); *G01N 2001/4061* (2013.01); *G01N 2030/009* (2013.01)

(58) Field of Classification Search
CPC ............. G01N 1/405; G01N 2030/009; G01N 2030/062; G01N 2001/4061
(Continued)

(56) References Cited

U.S. PATENT DOCUMENTS 8,598,325 B2  12/2013  Pawliszyn
9,733,234 B2   8/2017  Pawliszyn et al.
(Continued)

FOREIGN PATENT DOCUMENTS

CA    2945845 A1 * 12/2015  ............ B01J 20/286
CN   102872834 A     1/2013
(Continued)

OTHER PUBLICATIONS

Zhang et al., "Zeolitic Imidazole Framework Templated Synthesis of Nanoporous Carbon as a Novel Fiber Coating for Solid-Phase Microextraction," The Analyst, Feb. 2016, vol. 141 (3), pp. 1127-1135.
(Continued)

*Primary Examiner* — Daniel S Larkin
*Assistant Examiner* — Nashmiya S Fayyaz
(74) *Attorney, Agent, or Firm* — BORDEN LADNER GERVAIS LLP; David A. Nauman

(57) ABSTRACT

A device for extracting a molecule of interest from a sample matrix. The device includes a support comprising a support surface; a sealing layer that at least partially coats the support surface; and an extractive phase coating applied to a portion of the sealing layer. The extractive phase coating is adapted to contain the molecule of interest. The sealing layer sufficiently coats the support surface to prevent the support surface from coming in contact with the sample matrix when the extractive phase coating is fully immersed in the sample matrix. Analytical screening devices and methods of manufacture are also disclosed.

19 Claims, 5 Drawing Sheets

(51) Int. Cl.
*G01N 1/40* (2006.01)
*G01N 30/00* (2006.01)

(58) Field of Classification Search
USPC ...................................................... 73/863.21
See application file for complete search history.

(56) References Cited

U.S. PATENT DOCUMENTS

| | | | |
|---|---|---|---|
| 10,545,077 B2 | 1/2020 | Pawliszyn et al. | |
| 2012/0164286 A1* | 6/2012 | Pawliszyn | G01N 1/405 502/402 |
| 2015/0231602 A1* | 8/2015 | Pawliszyn | B01J 20/283 422/255 |
| 2017/0102399 A1 | 4/2017 | Mamenta | |

FOREIGN PATENT DOCUMENTS

| | | | |
|---|---|---|---|
| EP | 3999859 A1 | | 5/2022 |
| JP | 2017517752 A | * | 6/2017 |
| WO | 2015188283 A1 | | 12/2015 |
| WO | 2017147707 A1 | | 9/2017 |
| WO | 2020041865 A1 | | 3/2020 |

OTHER PUBLICATIONS

"Screening and Confirmation of Animal Drug Residues by UHPLC-MS-MS," at www.fsis.usda.gov/wps/wcm/connect/b9d45c8b-74d4-4e99-8eda-5453812eb237/CLG-MRM1.pdf?MOD=AJPERES.

Feng et al., "A Novel Silver-Coated Solid-phase Microextraction Metal Fiber Based on Electro Less Plating Technique," Analytica Chimica Acta, 2011, vol. 701(2), pp. 174-180.

Gomez et al., "Development of Coated Blade Spray Ionization Mass Spectrometry for the Quantitation of Target Analytes Present in Complex Matrices," Angewandte Chemie, Dec. 2014, vol. 53 (52), pp. 14731-14735.

Gomez et al., "Quantitative Analysis of Biofluid Spots by Coated Blade Spray Mass Spectrometry, A New Approach to Rapid Screening," Scientific Reports, Nov. 2017, vol. 7 (1), pp. 1-7.

Berendsen et al., "A Critical Assessment of the Performance Criteria in Confirmatory Analysis for Veterinary Drug Residue Analysis Using Mass Spectrometric Detection in Selected Reaction Monitoring Mode," Drug Testing and Analysis, May 2016, vol. 8 (5-6), pp. 477-490.

International Patent Application No. PCT/CA2020/051585, International Search Report and Written Opinion dated Feb. 23, 2021.

Khaled., "Automated High-Throughput Analysis of Multi-Class Multi-Residue Pharmaceutical Drugs in Animal Tissue Using Solid Phase Microextraction," 2020, Doctoral Philosophy, University of Waterloo.

Khaled et al., "Comparison of Solid-Phase Microextraction to Solvent Extraction and Quechers for Quantitative Analysis of Veterinary Drug Residues in Chicken and Beef Matrices," Journal of Agricultural and Food Chemistry, Nov. 2019, vol. 67 (46), pp. 12663-12669.

Khaled et al., "Development and Validation of a Fully Automated Solid Phase Microextraction High Throughput Method for Quantitative Analysis of Multiresidue Veterinary Drugs in Chicken Tissue," Analytica Chimica Acta, May 2019, vol. 16, pp. 34-46.

Khaled et al., "Optimization of Coated Blade Spray for Rapid Screening and Quantitation of 105 Veterinary Drugs in Biological Tissue Samples," Analytical Chemistry, Apr. 2020, vol. 92 (8), pp. 5937-5943.

Liu et al., "A Tri-Metal Centered Metal-Organic Framework for Solid-Phase Microextraction of Environmental Contaminants With Enhanced Extraction Efficiency," Analytica Chimica Acta, 2017, vol. 987, pp. 38-46.

Liu et al., "Knitting Aromatic Polymers for Efficient Solid-phase Microextraction of Trace Organic Pollutants," Journal of Chromatography A, 2016, vol. 1450, p. 9-16.

Liu et al., "Mesoporous TiO2 Nanoparticles for Highly Sensitive Solid-phase Microextraction of Organochlorine Pesticides," Analytica Chimica Acta, 2015, vol. 878, pp. 109-117.

Mirnaghi et al., "Reusable Solid-Phase Microextraction Coating for Direct Immersion Whole-Blood Analysis and Extracted Blood Spot Sampling Coupled with Liquid Chromatography-Tandem Mass Spectrometry and Direct Analysis in Real Time-Tandem Mass Spectrometry", Analytical Chemistry, Aug. 2012, vol. 84 (19), pp. 8301-8309.

Pawliszyn., "Handbook of Solid Phase Microextraction," Elsevier, 2011, pp. 61-97.

Reyes-Garces et al., "Advances in Solid Phase Microextraction and Perspective on Future Directions," Analytical Chemistry, 2017, vol. 90(1), pp. 302-360.

Reyes-Garces et al., "Solid Phase Microextraction Devices Prepared on Plastic Support as Potential Single-Use Samplers for Bioanalytical Applications," Analytical Chemistry, 2015, vol. 87(19), pp. 9722-9730.

Silva et al., "Optimization of Fiber Coating Structure Enables Direct Immersion Solid Phase Microextraction and High-Throughput Determination of Complex Samples," Analytical Chemistry, Aug. 2012, vol. 84 (16), pp. 6933-6938.

Souza-Silva et al., "Methodical Evaluation and Improvement of Matrix Compatible PDMS-overcoated Coating for Direct Immersion Solid Phase Microextraction Gas Chromatography (DI-SPME-GC)based Applications," Analytica Chimica Acta, May 2016, vol. 920, pp. 1-28.

Vuckovic et al., "Automated Solid-phase Micro extraction and Thin-Film Micro extraction for High-Throughput Analysis of Biological Fluids and Ligand-Receptor Binding Studies," Nature Protocols, Jan. 2010, vol. 5, pp. 140-161.

Xie et al., "Preparation and Characterization of Metal-Organic Framework MIL-101 (Cr)-coated Solid-phase Microextraction Fiber," Analytica Chimica Acta, 2015, vol. 853, pp. 303-310.

Canadian Patent Application No. 3160726 Office Action dated May 18, 2023.

European Patent Application No. 20889621.7, Extended European Search Report dated Nov. 15, 2023.

* cited by examiner

DEVICE FOR EXTRACTING A MOLECULE OF INTEREST FROM A SAMPLE MATRIX, AND ASSOCIATED METHODS

CROSS REFERENCE TO RELATED APPLICATION

This application claims the benefit of priority of U.S. Provisional Patent Application No. 62/939,313 filed Nov. 22, 2019, which is hereby incorporated by reference in its entirety.

FIELD

The present disclosure generally relates to methods, devices, and systems for one or more of collection, enrichment, and analysis of molecules of interest in mass spectrometry.

BACKGROUND

The following paragraphs are not an admission that anything discussed in them is prior art or part of the knowledge of persons skilled in the art.

Mass spectrometry (MS) is one of the technologies most commonly used for the qualitative and quantitative analysis of molecules of interest in complex matrices. Molecules of interest present on a given sample can be extracted via diverse sample preparation methods such solid phase extraction (SPE), liquid-liquid extraction (LLE) or solid phase micro extraction (SPME). Sample preparation is used to optimize a sample for analysis in a mass spectrometer.

In solid-phase extraction, compounds that are dissolved or suspended in a liquid mixture are separated from other compounds in the mixture according to their chemical and/or physical properties. Solid phase extraction may be used to concentrate and/or purify samples for analysis, for example isolate analytes of interest from a variety of matrices such as blood and urine.

Subsequently these enriched molecules can be introduced into the mass spectrometer, typically, via gas chromatography or liquid chromatography. Although thorough, classical sample preparation workflows coupled with the traditional chromatographic methods can be expensive, time-consuming and burdensome when trying to obtain qualitative or semi-quantitative information. Hence, over the last decade, different technologies, based on the direct interface of the sample to the mass spectrometer, have been developed to reduce cost, sample treatment, total analysis time and workflow simplicity. Such technologies are referred to as direct-sample-to-MS, meaning direct sample to mass spectrometer.

Such technologies that do not include either sample preparation or separation steps in their experimental workflows include paper spray ionization (PSI), direct analysis in real time (DART), rapid evaporative ionization mass spectrometry (REIMS), laser ablation electrospray ionization (LAESI), liquid extraction surface analysis (LESA), desorption electrospray ionization (DESI) and dielectric barrier discharge ionization (DBDI).

Introduction

The following introduction is intended to introduce the reader to this specification but not to define any invention. One or more inventions may reside in a combination or sub-combination of the apparatus elements or method steps described below or in other parts of this document. The inventors do not waive or disclaim their rights to any invention or inventions disclosed in this specification merely by not describing such other invention or inventions in the claims.

A concern for human health is the presence of drug and chemical residues in the edible tissues of food animals. Thanks to its selective and fast scanning capabilities, tandem mass spectrometry (MS/MS) is arguably considered one of the most effective analytical techniques for fast screening and quantitation of a large number of target analytes within one short run. However, matrices such as biological tissues can be extremely complex to analyze via mass spectrometry (MS) due to their high fat and protein content, as such compounds are very likely to cause interferences in the MS.

Solid phase microextraction (SPME) can be used to isolate and enrich a wide variety of analytes from biological samples with minimal co-extraction of proteins, salts, and other matrix macromolecules. SPME-based devices can integrate sample preparation and direct sample introduction into a mass-spectrometry (MS) system in a single device. One example of such a device is the coated blade spray (CBS), which can be used for rapid qualitative and quantitative analysis of biological fluids such as blood, plasma, and urine.

However, the authors of the present disclosure recognized that analysis of tissue samples, such as homogenized tissue, is more challenging than analysis of biological fluids since tissue debris, for example macromolecules and cellular debris, may adhere to the SPME-based device. Such tissue debris would need to be removed from the SPME-based device before MS analysis. Although tissue debris can be removed from an SPME-based device through mechanical means, such as by wiping the tissue off the device, this is impractical in automated high-throughput workflows.

The authors of the present disclosure also determined that tissue debris did not adhere to the extractive coating of the SPME-based device, but rather adhered to the support surface on which the extractive coating was applied.

Generally, the present disclosure provides a device for extracting a molecule of interest from a sample matrix, such as a tissue sample. The extraction device includes an extractive coating on a support surface. The extractive coating is adapted to interact with the sample matrix to extract the molecule of interest. The extraction device also includes a protective layer that prevents or reduces adherence of tissue debris on the support surface when the extractive coating is fully immersed in the sample matrix.

In some examples, the extraction device may have an insertion end and a mounting end. The mounting end may alternatively be referred to as a holding end. The insertion end is for inserting into the sample matrix, and the extractive phase coating may extend from the insertion end towards the mounting end. The sealing layer extends past the end of the extractive phase coating so that, when the extractive phase coating is fully immersed in the sample matrix, the sample matrix does not interact with the support surface but instead interacts with the sealing layer. The sealing layer prevents or reduces adherence of tissue debris on the support surface.

In one example, the extraction device includes a support comprising a support surface, such as a previously etched stainless-steel support surface; a sealing layer that at least partially coats the support surface; and an extractive phase coating applied to a portion of the sealing layer, the extractive phase coating adapted to contain the molecule of interest. The sealing layer sufficiently coats the support surface to prevent the support surface from coming in contact with the sample matrix when the extractive phase coating is fully immersed in the sample matrix.

The present disclosure also provides a high-throughput screening device comprising a plurality of extraction devices as described herein.

The present disclosure also provides a method of manufacturing an extraction device as described herein. The method includes: providing a support comprising a support surface; applying a sealing layer to at least partially coat the support surface; and applying an extractive phase coating to a portion of the sealing layer while leaving a portion of the sealing layer uncoated. The uncoated portion of the sealing layer is adapted to prevent the support surface from coming in contact with the sample matrix when the extractive phase coating is fully immersed in the sample matrix. In some examples, the method includes dip coating the support surface with a sealing composition to form the sealing layer, and dip coating a portion of the sealing layer with an extractive composition to form the extractive phase coating.

The present disclosure also provides a method that includes: inserting an extraction device according to the present disclosure into a sample matrix that includes a tissue of a live animal. The extractive phase coating is fully immersed in the sample matrix and at least some of the sealing layer is not immersed in the sample matrix. The method includes withdrawing the extraction device from the sample matrix; and analyzing a molecule of interest extracted from the sample matrix. The analysis may be by mass spectrometry, for example direct-to-MS analysis.

In some examples, the present disclosure provides a device for extracting a molecule of interest from a sample matrix. The device includes a support that includes a previously etched stainless-steel support surface; a sealing layer that at least partially coats the stainless-steel support surface; and an extractive phase coating applied to a portion of the sealing layer. The sealing layer sufficiently coats the stainless-steel support surface to prevent the stainless-steel support surface from coming in contact with the sample matrix when the extractive phase coating is fully immersed in the sample matrix. The sealing layer may include a layer of a biocompatible polymer, such as polyacrylonitrile (PAN). The sealing layer may have an average thickness of about 0.5 to about 5 µm. The extractive phase coating layer may include a biocompatible polymer, such as polyacrylonitrile (PAN). The support may be in the shape of a blade. The extractive phase coating may adhere to the sealing layer better than it adheres to a previously etched stainless-steel support surface that lacks the sealing layer. The sample may be a biological tissue sample. The extractive phase coating may not coat any of the stainless-steel support surface.

In some examples, the present disclosure provides a device for extracting a molecule of interest from a sample matrix. The device includes a support comprising a support surface; a sealing layer that at least partially coats the support surface; and an extractive phase coating applied to a portion of the sealing layer, the extractive phase coating adapted to contain the molecule of interest. The sealing layer sufficiently coats the support surface to prevent the support surface from coming in contact with the sample matrix when the extractive phase coating is fully immersed in the sample matrix. The sealing layer may include a layer of a biocompatible polymer, such as: polyacrylonitrile (PAN); polyethylene glycol (PEG), polydimethylsiloxane (PDMS), a fluorocarbon polymer, or co-polymer comprising one or more of PAN, PEG, PDMS and a fluorocarbon polymer. The extractive phase coating layer may include a biocompatible polymer, for example the extractive phase coating layer may include a sorptive material immobilized in a biocompatible polymer. The sorptive material may include: normal-phase silica particles, C-1/silica particles, C-4/silica particles, C-6/silica particles, C-8/silica particles, C-18/silica particles, C-30/silica particles, reverse-phase amide silica particles, HS-F5/silica particles, phenyl/silica particles, cyano/silica particles, diol/silica particles, ionic liquid/silica particles, molecular imprinted polymer particles, hydrophilic-lipophilic-balance (HLB) particles, carboxen 1006 particles, carbowax particles, divinylbenzene (DVB) particles, octadecylsilane particles, nanoparticles, processed mineral based particles, carbon nanotubes, functionalized-carbon nanotubes, graphene, graphene oxide, functionalized-graphene, quantum dots, organic polymeric particles optionally functionalized with an organic moiety (such as a carbon chain, a strong cation moiety, a weak cation moiety, a strong anion moiety, or a weak anion moiety), inorganic polymeric particles optionally functionalized with an organic moiety (such as a carbon chain, a strong cation moiety, a weak cation moiety, a strong anion moiety, or a weak anion moiety), or any combination thereof. The HLB particles may include or may be a copolymerization polymer product of N-vinylpyrrolidinone and divinylbenzene. The biocompatible polymer may be polyacrylonitrile (PAN); polyethylene glycol (PEG), polydimethylsiloxane (PDMS), a fluorocarbon polymer, or co-polymer including one or more of PAN, PEG, PDMS and a fluorocarbon polymer. The support surface may be a metal support surface, such as stainless-steel. The support surface may be stainless-steel etched by immersion in an aqueous sodium chloride solution, such as a saturated sodium chloride solution, under application of a voltage, such as a voltage of about 3.5 V. The sealing layer may extend at least 5 mm, such as about 10 mm or about 15 mm, past an end of the extractive phase coating. The area of the support surface covered by the sealing layer may be at least 10% greater than the area covered by the extractive phase coating. The area of the support surface covered by the sealing layer may be about 25%, about 50%, about 75%, about 100%, about 150%, about 200%, or more than 200% greater than the area covered by the extractive phase coating. The sealing layer may have an average thickness of about 0.5 to about 5 µm. The support may include one or more edges for spray ionization. The support may define an indentation for receiving a desorption solvent, preferably wherein at least part of the indentation is in the form of a channel extending to an edge of the support for guiding the desorption solvent containing the molecule of interest towards the edge for spray ionization. The channel may be disposed at a tip of the support for guiding the desorption solvent containing the molecule of interest towards the tip. At least part of the indentation may be in the form of a compartment for receiving the desorption solvent and extraction phase, wherein the compartment is connected to the channel. A region of the support defining the indentation may include no extraction phase. The support may have a tip having a substantially triangular shape and being defined by at least two edges that meet at an angle from about 8 degrees to about 90 degrees. The support may have a substantially homogeneous thickness from about 0.01 mm to about 2 mm. The support may have a length from about 1 to about 10 cm, a width from about 0.1 to about 5 mm, and a thickness from about 0.1 mm to about 2 mm. The support may include a substantially edgeless member, such as a substantially cylindrical member. The substantially edgeless member may be from about 3 to about 7 cm, such as about 5 cm, in length.

The substantially edgeless member may be a substantially cylindrical member with a diameter from about 1 mm to about 2 mm.

In some examples, the present disclosure provides a high-throughput screening device that includes a plurality of extraction devices as discussed herein. The extraction devices may include an extractive coating that is about 60 μm thick and is about 2 cm in length. The relative standard deviation (RSD) of the thickness of the extractive coating may be less than 10%; and the relative standard deviation (RSD) of the length of the extractive coating may be less than 10%. The plurality of extraction devices may be arranged in an array of at least 96 extraction devices, such as an array of 192, 384, 1536, 3456 or 6144 extraction devices.

In some examples, the present disclosure provides a method of manufacturing a device for extracting a molecule of interest from a sample matrix. The method includes providing a support comprising a support surface; applying a sealing layer to at least partially coat the support surface; and applying an extractive phase coating to a portion of the sealing layer while leaving a portion of the sealing layer uncoated. The uncoated portion of the sealing layer is adapted to prevent the support surface from coming in contact with the sample matrix when the extractive phase coating is fully immersed in the sample matrix. The support (a) may include one or more edges for spray ionization or (b) may be a substantially edgeless member, and the method may include: dip coating the support surface with a sealing composition to form the sealing layer, and dip coating a portion of the sealing layer with an extractive composition to form the extractive phase coating. The support, support surface, sealing layer, and extractive phase coating may be as discussed herein.

In some examples, the present disclosure provides a method that includes inserting an extraction device as discussed herein into a sample matrix that includes a tissue of a live animal, where the extractive phase coating is fully immersed in the sample matrix and at least some of the sealing layer is not immersed in the sample matrix; withdrawing the extraction device from the sample matrix; and analyzing a molecule of interest extracted from the sample matrix, such as by mass spectrometry.

BRIEF DESCRIPTION OF THE DRAWINGS

Embodiments of the present disclosure will now be described, by way of example only, with reference to the attached Figures.

DETAILED DESCRIPTION

Figure 1:
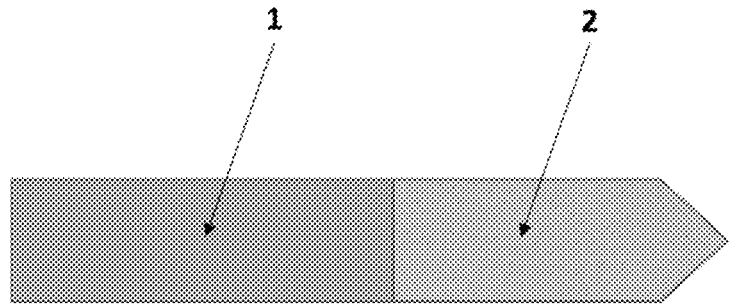
FIG. 1 is an illustration of a coated blade according to the prior art.

Generally, the present disclosure provides a device for extracting a molecule of interest from a sample matrix. The device includes: a support comprising a support surface; a sealing layer that at least partially coats the support surface; and an extractive phase coating applied to a portion of the sealing layer. The extractive phase coating is adapted to contain the molecule of interest. The sealing layer sufficiently coats the support surface to prevent the support surface from coming in contact with, such as by touching, the sample matrix when the extractive phase coating is fully immersed in the sample matrix.

In some examples according to the present disclosure, the extraction device is adapted to be introduced into a tissue sample, such as homogenized animal tissue or non-homogenized tissue. Examples of homogenized animal tissue which may be extracted with an extraction device of the present disclosure include homogenized muscle or liver tissue, such as bovine muscle or liver tissue. In some examples, homogenized animal tissue samples may be prepared by freezing and cryogenically grinding tissue samples to produce a substantially uniform fine powder, such as by using a Freezer/Mill® Cryogenic Grinder (SPEX SamplePrep, LLC, Metuchen, NJ, USA). The homogenized tissue may be stored frozen, such as at −80° C., until analysis. For analysis, the homogenized tissue may be brought to room temperature, vortexed, and hydrated. In some examples, the extraction device is adapted to be directly introduced into muscle or liver tissue, such as bovine muscle or liver tissue. The muscle or liver tissue may be from a live animal.

Support

Extraction devices according to the present disclosure support the sealing layer and the extractive phase coating on a support surface. Features associated with the support and support surface discussed in this section may be combined with features of the extraction device discussed in other sections of this disclosure.

The support may be adapted to be introduced into the sample matrix, and/or for direct-to-MS analysis.

In some examples, the support may include one or more edges for spray ionization. The support may define an indentation for receiving a desorption solvent, preferably wherein at least part of the indentation is in the form of a channel extending to an edge of the support for guiding the desorption solvent containing the molecule of interest towards the edge for spray ionization. The channel may be disposed at a tip of the support for guiding the desorption solvent containing the molecule of interest towards the tip. At least part of the indentation may be in the form of a compartment for receiving the desorption solvent and extraction phase, wherein the compartment is connected to the channel. A region of the support defining the indentation may include no extraction phase. The support may have a tip having a substantially triangular shape and being defined by at least two edges that meet at an angle from about 8 degrees to about 90 degrees. The support may have a substantially homogeneous thickness from about 0.01 mm to about 2 mm. The support may have a length from about 1 to about 10 cm, a width from about 0.1 to about 5 mm, and a thickness from about 0.1 mm to about 2 mm.

In some specific examples where the support is adapted for direct-to-MS analysis, an extraction device according to the present disclosure may be a coated blade spray device as disclosed in WO2020041865A1, which is incorporated herein by reference. In such examples, the extraction phase is applied to a portion of the sealing layer as discussed herein.

In other examples, the support may include a substantially edgeless member, such as a substantially cylindrical member. The substantially edgeless member may be from about 3 to about 7 cm, such as about 5 cm, in length. The substantially edgeless member may be a substantially cylindrical member with a diameter from about 1 mm to about 2 mm.

In extraction devices according to the present disclosure, the support may comprise or consist of any suitable material or materials, for example a metal, a metal alloy, a glass, a fabric, a polymer, a polymer metal oxide, or any combination thereof. In some examples, the support surface may be a metal support surface, such as stainless-steel. The stainless-steel may be etched by immersion in an aqueous sodium chloride solution, such as a saturated sodium chloride solution, under application of a voltage, such as a voltage of about 3.5 V. Etched stainless-steel that is not coated by a sealing layer may be susceptible to adhesion of at least some matrix macromolecules, cells, and/or fat present in the sample matrix.

Sealing Layer

Extraction devices according to the present disclosure include a sealing layer on the support surface. Features associated with the sealing layer discussed in this section may be combined with features of the extraction device discussed in other sections of this disclosure.

The sealing layer is applied in an amount and on locations to sufficiently coat the support surface to prevent the support surface from coming in contact with the sample matrix when the extractive phase coating is fully immersed in the sample matrix.

For example, the support may be a blade for a coated blade spray device or a substantially cylindrical member. The support may have an insertion end and a mounting end, and the sealing layer may be applied to coat the substantially cylindrical member from the insertion end towards the mounting end. The extractive phase coating may be applied on the sealing layer, leaving a portion of the sealing layer extending past the end of the extractive phase coating. This allows the extractive phase coating to be fully immersed in the sample matrix, while preventing or inhibiting the sample matrix from interacting with the support surface.

The sealing layer may extend at least 5 mm, such as about 10 mm or about 15 mm, past an end of the extractive phase coating. The area of the support surface covered by the sealing layer may be at least 10% greater than the area covered by the extractive phase coating. For example, the area of the support surface covered by the sealing layer may be about 25%, about 50%, about 75%, about 100%, about 150%, about 200%, or more than 200% greater than the area covered by the extractive phase coating.

Smaller differences between the end of the extractive phase coating and the start of the unsealed support surface, such as a 5 mm difference or a sealing area that is 10% greater than the area covered by the extractive phase, may provide enough protection to the support surface when the extraction device is used in an automated analysis system, such as a high-throughput system, where the extraction device is consistently inserted into the sample matrix at the same depth. A larger difference, such as a difference of about 10 or about 15 mm or a sealing area that is 100% to 200% greater than the area covered by the extractive phase coating, may be beneficial when the extraction device is used in a manual analysis. The larger difference provides a greater margin for preventing or inhibiting the sample matrix from interacting with the support surface.

The sealing layer may be a layer of a biocompatible polymer, such as: polyacrylonitrile (PAN); polyethylene glycol (PEG), polydimethylsiloxane (PDMS), a fluorocarbon polymer, or a co-polymer that includes one or more of PAN, PEG, PDMS and a fluorocarbon polymer. Examples of fluorocarbon polymers that may be used in devices according to the present disclosure include: polyvinylidene fluoride (PVDF); a copolymer of tetrafluoroethylene and 2,2-bistrifluoromethyl-4,5-difluoro-1,3-dioxole, such as a copolymer in the ratio of 13:87 or a copolymer in the ratio of 35:65; and fluorocarbon polymers disclosed in WO2017147707A1, which is incorporated herein by reference.

The sealing layer may have an average thickness of about 0.5 to about 5 μm.

Some biocompatible polymers may provide additional benefits when used in combination with specific support surfaces and/or specific extractive phase coatings. For example, a PAN sealing layer may provide one or more benefits when used with PAN-based extractive phase coatings and when the support surface is etched stainless-steel. The PAN-based extractive phase coating may adhere better to the PAN sealing layer than to etched stainless-steel. In some examples, an improved adherence may result in a PAN-based extractive phase coating that remains adhered to the PAN sealing layer and the etched stainless-steel support surface when exposed to conditioning or extraction conditions that would result in at least some peeling of an otherwise identical PAN-based extractive phase coating that was directly adhered to the stainless-steel support.

Extractive Phase Coating

Extraction devices according to the present disclosure include an extractive phase coating layered on the sealing layer. Features associated with the extractive phase coating discussed in this section may be combined with features of the extraction device discussed in other sections of this disclosure.

The extractive phase coating layer may include a biocompatible polymer. The extractive phase coating layer may include a sorptive material immobilized in a biocompatible polymer. The sorptive material may be adsorptive material or absorptive material.

The adsorptive or absorptive material may be selected based on the features of the intended analyte being extracted, and the intended desorption strategy. The adsorptive or absorptive material may be considered an extractive material in that it adsorbs or absorbs analytes for extraction and removal from the sample matrix. In some examples, the sorptive material may be a porous material having meso- macro- or micro-pores. In some examples, the pores may have diameters from about 10 Å to about 10,000 Å. Such pores allow the analyte to be extracted onto or into the adsorptive or absorptive material. The pores may preferably be from about 100 Å to about 180 Å. These pore sizes provide sufficient surface area to adsorb or absorb enough analytes to be detectable, while also being an appropriate size to allow desorption so that micro-condensation is reduced or avoided. Larger pore sizes may be desirable when the target analyte is a large biomolecule, such as a protein or a peptide. The surface area of the particulate sorptive material may be from about 10 $m^2/g$ to about 3000 $m^2/g$. For example, the surface area of hydrophilic-lipophilic-balance (HLB) particles may be, from about 200 $m^2/g$ to about 800 m²/g, while the surface area of carbon nanotubes and nanosheets may be up to 3000 m²/g.

The adsorptive or absorptive material may be particles, nanosheets, and/or nanotubes that are suspended in the fluorocarbon polymer. Particles which may be used in coatings according to the present disclosure may be from about 1 nm to about 20 µm in diameter. Preferably, the particles may be from about 2 µm to about 20 µm in diameter, and more preferably from about 3 µm to about 10 µm in diameter. Even more preferably, the particles may be from about 3 µm to about 7 µm in diameter. Particles from about 3 µm to about 7 µm in diameter may be particularly useful as smaller sized particles have less of an effect on coating thickness and coating homogeneity than larger particles. Depending on the thickness of the coating and the relative size differences between the particles, using smaller particles may result in a coating that is more uniform in thickness and has a more homogeneous particle distribution than a coating made with larger particles. A "uniform thickness" should be understood to refer to a thickness that varies by less than 5% over the support surface. The particles may be spherical, or substantially spherical. Nanosheets which may be used in coatings according to the present disclosure may be about 1 nm to about 100 nm in thickness. Nanotubes which may be used in coatings according to the present disclosure may have a diameter from about 1 nm to about 10 nm. Preferably, the nanotubes have a diameter from about 4 nm to about 6 nm.

With some adsorptive or absorptive material, a homogeneous coating surface may be obtained when the largest dimension of the adsorptive material is less than about half the thickness of the coating. In the context of the present disclosure a "homogeneous coating surface" should be understood to refer to a coating surface having a substantially uniform distribution of the adsorptive or absorptive material and the fluorocarbon polymer on the support surface.

The adsorptive or absorptive material may be selected based on its compatibility with the intended desorption method. The adsorptive or absorptive material may be inorganic (for example a silica-based material or a metal oxide-based material), organic (for example a carbon-, carboxen- or divinylbenzene-based material), an inorganic/organic hybrid (for example a silica and organic polymer), or a mixture of inorganic and organic materials. In particular examples, the adsorptive or absorptive material may be: normal-phase silica particles, C-1/silica particles, C-4/silica particles, C-6/silica particles, C-8/silica particles, C-18/silica particles, C-30/silica particles, reverse-phase amide silica particles, HS-F5/silica particles, phenyl/silica particles, cyano/silica particles, diol/silica particles, ionic liquid/silica particles, molecular imprinted polymer particles, hydrophilic-lipophilic-balance (HLB) particles, carboxen 1006 particles, carbowax particles, divinylbenzene (DVB) particles, octadecylsilane particles, nanoparticles, processed mineral based particles, carbon nanotubes, functionalized-carbon nanotubes, graphene, graphene oxide, functionalized-graphene, quantum dots, or any combination thereof. The functionalized-carbon nanotubes and functionalized-graphene may be functionalized with a polar or non-polar functionality. The polar functionality may be ionic. The functional group may be used to tune the extraction capability of the adsorptive or absorptive material towards a targeted compound, or a targeted class of compounds. For example, a cationic compound may be targeted for extraction by using an anionic-functionalized-carbon nanotube.

HLB particles may have a specific surface area from about 700 m²/g to about 900 m²/g; average pore diameters from about 70 angstroms to about 90 angstroms; total pore volumes from about 1.15 cm³/g to about 1.45 cm³/g; and/or an average particle diameter from about 5.2 to about 5.7 µm. An exemplary HLB particle is made by Waters and sold under the trade name Oasis HLB. The Oasis HLB particles are made from copolymerization of two monomers, the hydrophilic N-vinylpyrrolidinone and the lipophilic divinylbenzene. The resulting HLB particles include both hydrophilic groups and lipophilic groups, and have a specific surface area of about 762 m²/g, an average pore diameter of about 79 angstroms, a total pore volume of about 1.18 cm³/g and an average particle diameter of about 5.47 µm.

In some examples of the present disclosure, the sorptive particulate material may include: normal-phase silica particles, C-1/silica particles, C-4/silica particles, C-6/silica particles, C-8/silica particles, C-18/silica particles, C-30/silica particles, reverse-phase amide silica particles, HS-F5/silica particles, phenyl/silica particles, cyano/silica particles, diol/silica particles, ionic liquid/silica particles, molecular imprinted polymer particles, hydrophilic-lipophilic-balance (HLB) particles, carboxen 1006 particles, carbowax particles, divinylbenzene (DVB) particles, octadecylsilane particles, nanoparticles, processed mineral based particles, carbon nanotubes, functionalized-carbon nanotubes, graphene, graphene oxide, functionalized-graphene, quantum dots, organic polymeric particles optionally functionalized with an organic moiety (such as a carbon chain, a strong cation moiety, a weak cation moiety, a strong anion moiety, or a weak anion moiety), inorganic polymeric particles optionally functionalized with an organic moiety (such as a carbon chain, a strong cation moiety, a weak cation moiety, a strong anion moiety, or a weak anion moiety), or any combination thereof.

In some example of the present disclosure, the biocompatible polymer may be polyacrylonitrile (PAN); polyethylene glycol (PEG), polydimethylsiloxane (PDMS), a fluorocarbon polymer, or a co-polymer that includes one or more of PAN, PEG, PDMS and a fluorocarbon polymer. As noted above, examples of fluorocarbon polymers that may be used in devices according to the present disclosure include: polyvinylidene fluoride (PVDF); a copolymer of tetrafluoroethylene and 2,2-bistrifluoromethyl-4,5-difluoro-1,3-dioxole, such as a copolymer in the ratio of 13:87 or a copolymer in the ratio of 35:65; and fluorocarbon polymers disclosed in WO2017147707A1.

Although any of the above adsorptive or absorptive materials may be used for disposable coatings, some adsorptive or absorptive materials are suitable for use in coatings that are used more than once. For example, organic or inorganic polymeric particles functionalized by organic moieties (such as carbon chains from C-1 to C-30, strong and weak cation moieties, or strong and weak anion moieties) may be used more than once in solvent-assisted desorption methods. In other examples, carbon based sorbents, inorganic sorbents, divinylbenzene-based particles, and hydrophilic-lipophilic-balance particles may be used more than once with thermal- and/or solvent-assisted desorption methods. An example of an adsorptive or absorptive material that can be used in coatings that are used more than once in a direct-to-MS method is a hydrophilic-lipophilic-balance (HLB) particle, such as HLB particles discussed above.

The extraction coating may be loaded with one or more standards prior to exaction of any analytes of interest from the sample matrix. The internal standards may help to account for variations in the sample preparation, coating thickness, instrument response, extraction conditions, desorption of the extracted analyte, ionization of the desorbed analyte, or any combination thereof. The internal standards may be loaded on the extraction coating by exposing the coating to a known concentration (for example 50.0 µg/L) of one or more known compounds.

The internal standard for a specific analyte is preferably a stable isotope labeled form of that analyte. However, since many analytical methods are designed to test for multiple analytes, a more practical approach is to use one class-specific internal standard for each class of drugs, especially for analytes that exhibited significant matrix effects. The internal standard may be, for example, d5-Enrofloxacin for positive mode analytes and/or d3-Thiamphenicol for negative mode analytes. Examples of other standards include: codeine-$D_3$, 6-acetylmorphine-$D_3$, cocaine-$D_3$, and combinations thereof.

Analytical Screening Devices

Extraction devices according to the present disclosure may be used in a high-throughput screening device, such as in a high-throughput method. Extraction devices discussed in other sections of this disclosure may be used in combination with any features of the high-throughput screening devices discussed in this section.

A high-throughput screening device may include a plurality of extraction devices arranged in an array of at least 96 extraction devices, such as an array of 192, 384, 1536, 3456 or 6144 extraction devices. The extraction devices may be held by the screening device, or mounted on the screening device, at the mounting ends. The extraction devices may be arranged so that the insertion ends can be inserted into a complementary receiving array of sample matrixes.

The extraction devices may include an extractive coating that is about 60 µm thick and is about 2 cm in length. The sealing layer may extend from the insertion end towards the mounting end, at least about 0.5 cm past the end of the extractive coating. In some examples, the sealing layer may extend about 1.0 cm or about 1.5 cm past the end of the extractive coating.

The relative standard deviation (RSD) of the thickness of the extractive coating in the plurality of extraction devices may be less than 10%. The relative standard deviation (RSD) of the length of the extractive coating in the plurality of extraction devices may be less than 10%.

One example of a high-throughput screening device that may be used for automated sample preparation and analysis is a Concept-96 system (Professional Analytical Systems (PAS) Technology, Magdala, Germany). The Concept-96 system, or any other high-throughput screening device, may be used to (i) condition the extraction devices; and (ii) extract a molecule of interest from the sample matrixes. Optionally, the analysis may also include (iii) removing at least some tissue debris adhered to the support surface. Conditioning may include exposing the extraction devices to a MeOH:$H_2O$ solution (for example: 50:50, v/v/), such as for up to 15 minutes. Conditioning may additionally include stirring, for example at around 900 rpm. Extracting a molecule of interest may include exposing the conditioned extraction devices to the sample matrixes, such as for up to 15 minutes. Removing at least some of the tissue debris may include rinsing the extraction devices, such as with an acetone:$H_2O$ solution (for example: 15:85, v/v), such as for around 10 seconds with optional stirring, for example at around 900 rpm.

Analysis of the extracted molecule of interest may be performed using, for example, a TSQ Quantiva from Thermo Scientific (San Jose, CA, USA). Data analysis may be completed using TraceFinder 4.1, also from Thermo Scientific. The desorption may be performed using a mixture of $H_2O$, MeCN, and MeOH, such as in a volume ratio of about 5:15:80. The mixture may additionally include $NH_4F$, such as at a concentration of about 0.5 mM. The analysis may be performed in negative ionization mode followed by positive ionization mode, or vice versa. Negative ionization mode may be at minus 3.8 kV voltage for about 10 seconds. Positive ionization mode may be at plus 5 kV voltage for about 27 seconds. In this manner, an electrospray event may be produced at the tip of a coated blade spray extraction device, such as discussed above.

Low-Throughput Extraction and Analysis Methods

Extraction devices according to the present disclosure may be used in a high-throughput method as discussed above, or in a low-throughput method. Extraction devices discussed in other sections of this disclosure may be used in combination with any features of the low-throughput extraction and analysis methods discussed in this section.

One example of a low-throughput method includes inserting an extraction device according to the present disclosure into a sample matrix that includes a tissue of a live animal. The extractive phase coating is fully immersed in the sample matrix and at least some of the sealing layer is not immersed in the sample matrix. In this manner, the extractive phase coating is fully immersed in the sample matrix, but the uncoated portion of the sealing layer prevents the support surface from coming in contact with the sample matrix.

The method may include condition the extraction device, and/or optionally removing at least some tissue debris adhered to the support surface. Conditioning may include exposing the extraction device to a MeOH:$H_2O$ solution (for example: 50:50, v/v/), such as for up to 15 minutes. Conditioning may additionally include stirring, for example at around 900 rpm. Extracting a molecule of interest may include exposing the conditioned extraction device to the sample matrix, such as for up to 15 minutes. Removing at least some of the tissue debris may include rinsing the extraction device, such as with an acetone:$H_2O$ solution (for example: 15:85, v/v), such as for around 10 seconds with optional stirring, for example at around 900 rpm.

The method also includes withdrawing the extraction device from the sample matrix; and analyzing a molecule of interest extracted from the sample matrix. The analysis may include desorption, and may be by mass spectrometry, for example direct-to-MS analysis.

Analysis of the extracted molecule of interest may be performed using, for example, a TSQ Quantiva from Thermo Scientific (San Jose, CA, USA). Data analysis may be completed using TraceFinder 4.1, also from Thermo Scientific. The desorption may be performed using a mixture of $H_2O$, MeCN, and MeOH, such as in a volume ratio of about 5:15:80. The mixture may additionally include $NH_4F$, such as at a concentration of about 0.5 mM. The analysis may be performed in negative ionization mode followed by positive ionization mode, or vice versa. Negative ionization mode may be at minus 3.8 kV voltage for about 10 seconds. Positive ionization mode may be at plus 5 kV voltage for about 27 seconds.

In some examples, the extraction device includes an extractive coating that is about 60 µm thick and is about 2 cm in length. The sealing layer may extend from the insertion end towards the handling end, at least about 0.5 cm past the end of the extractive coating. In some examples, the sealing layer may extend about 1.0 cm or about 1.5 cm past the end of the extractive coating.

Methods of Manufacture

Extraction devices according to the present disclosure may be prepared as discussed below. Features related to the support, support surface, sealing layer, and extractive phase coating discussed in other sections of this disclosure may be used in methods discussed below.

In some examples, the present disclosure provides a method that includes providing a support comprising a support surface; applying a sealing layer to at least partially coat the support surface; and applying an extractive phase coating to a portion of the sealing layer while leaving a portion of the sealing layer uncoated. As discussed above, the uncoated portion of the sealing layer is adapted to prevent the support surface from coming in contact with the sample matrix when the extractive phase coating is fully immersed in the sample matrix.

The sealing layer, the extractive phase coating, or both may be applied onto the support by: dipping, spreading, brush painting, spraying, spin coating or electrospinning. The sealing layer and the extractive phase coating may be applied using different techniques.

The sealing layer, the extractive phase coating, or both may be applied to the support in a plurality of layers, such as a sufficient number of layers to provide a desired coating thickness. Applying the mixture in a plurality of layers may result in a coating that has improved bonding to the substrate, more uniform coating thickness across the coated area, or both.

When the sealing layer or the extractive phase coating are applied as curable compositions (such as composition that includes one or more monomers), the method may include a crosslinking and/or curing step. When the sealing layer or the extractive phase coating are applied as a solution that includes one or more dissolved polymers, the method may include one or more solvent evaporation steps.

In some examples, the method may include dip coating the support surface with a sealing composition to form the sealing layer, and dip coating a portion of the sealing layer with an extractive composition to form the extractive phase coating.

In a specific example, the support is in the shape of a blade, such as a coated blade spray device as disclosed in WO2020041865A1; and the method includes a step of dip coating a stainless-steel support in a solution that includes polyacrylonitrile (PAN) to provide a sealing layer that is about 20 mm in length. The dip coating is performed a sufficient number of times to result in a sealing layer that is about 5 µm thick. The sealed blade is then dip coated in a slurry of PAN and Hydrophilic-Lipophilic Balanced (HLB) particles to provide an extractive phase coating that is about 10 mm in length. The dip coating is performed a sufficient number of times to result in an extractive phase coating layer that is about 10 µm thick. This exemplary method results in an extraction device that has an extractive phase coating that is about 10 mm in length, and an uncoated portion of the sealing layer that is about 10 mm in length. The stainless-steel blade may be purchased from Shimifrez Incorporated (Concord, ON, CAN). The stainless-steel blade may be etched, as discussed above.

Exemplary Devices

In exemplary devices according to the present disclosure, the authors of the present disclosure provide the application of a very thin layer of a biocompatible polymeric phase such as polyacrylonitrile (PAN) to the blade prior to the application of the extractive phase coating. In such exemplary devices, the biocompatible undercoat layer serves to seal the surface of the previously etched stainless steel which will be in contact with the sample during the extraction process, thus reducing or eliminating adhesion of matrix macromolecules onto the bare stainless-steel surface resulting in cleaner extraction. In such exemplary devices, the length of the undercoat layer is longer than the extractive phase and of enough length to ensure that there is no contact between bare stainless-steel and the sample during the extraction step.

In such exemplary devices, the biocompatible polymeric layer is applied to seal the stainless-steel surface of the blade prior to applying the extractive phase coating. It is worth noting that this protective layer is applied under the extractive phase, not on top of it, in order to reduce or prevent slowing the kinetics during extraction, especially when performing static extraction. The disclosed procedure provides one or more of the following advantages: 1) it seals the previously etched stainless-steel surface which is in contact with the sample thus reducing or eliminating the adhesion of matrix debris and macromolecules onto the bare stainless-steel surface and resulting in cleaner extractions, 2) the sample is in contact with a biocompatible surface during extraction, 3) it serves as a primer binder layer where the extractive phase can better adhere to the stainless-steel support, and 4) reduces the etching time by approximately 30 minutes to prepare the stainless steel for the extractive phase coating.

Figure 2:
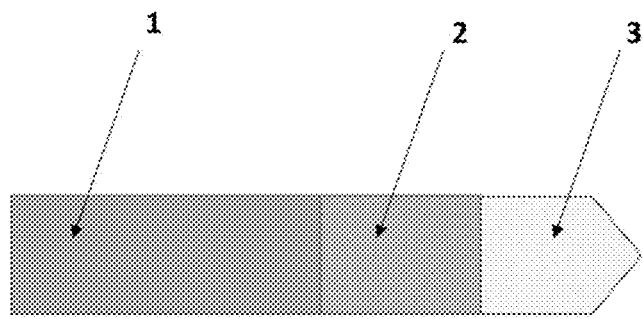
FIG. 2 is an illustration of a coated blade according to the present disclosure.
Figure 3:
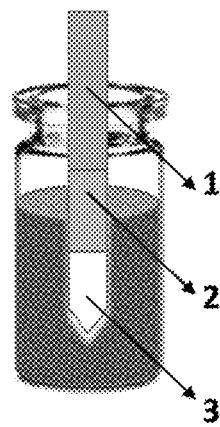
FIG. 3 is an illustration of the position of the coated blade of FIG. 2 in a sample during an extraction step.

FIG. 1 shows a blade (1) coated with a thin layer of a biocompatible polymeric phase (2) which will be in contact with the sample during the extraction step. FIG. 2 shows a blade according to the present disclosure, with both an undercoated layer (2) and an extractive phase (3). The term "undercoated layer" is an equivalent alternative to the term "sealing layer". FIG. 3 shows a position of the blade of FIG. 2 in the sample during the extraction step. As illustrated in FIG. 3, the entirety of the extractive phase (3) can be fully immersed in the sample while no uncoated stainless steel (1) touches the sample matrix. Hence only the undercoated layer (2) and the extractive phase (3) are ever in contact with the sample, thus reducing or preventing attachment of large macromolecule matrix components to the device.

Blades as illustrated in FIG. 2 were used for rapid and high-throughput screening and quantitation of 106 veterinary drugs in bovine tissue. The method was validated for linearity, limits of quantification (LOQ), precision and accuracy. Despite using only one internal standard for all analytes, excellent accuracy and precision results were achieved with more than 90% of analytes falling within the 70-130% range of their true concentrations and RSD≤30% at 0.4×, 0.75× and 1.5× concentration levels, where X is the maximum residue level (MRL) of the analyte. In terms of linearity, most of the analytes achieved linear correlation coefficients >0.99 within the evaluated range of concentrations (0.25-2.5×). In terms of LOQs, the method was able to meet both Canadian and U.S. regulatory levels for 106 compounds.

Figure 4:
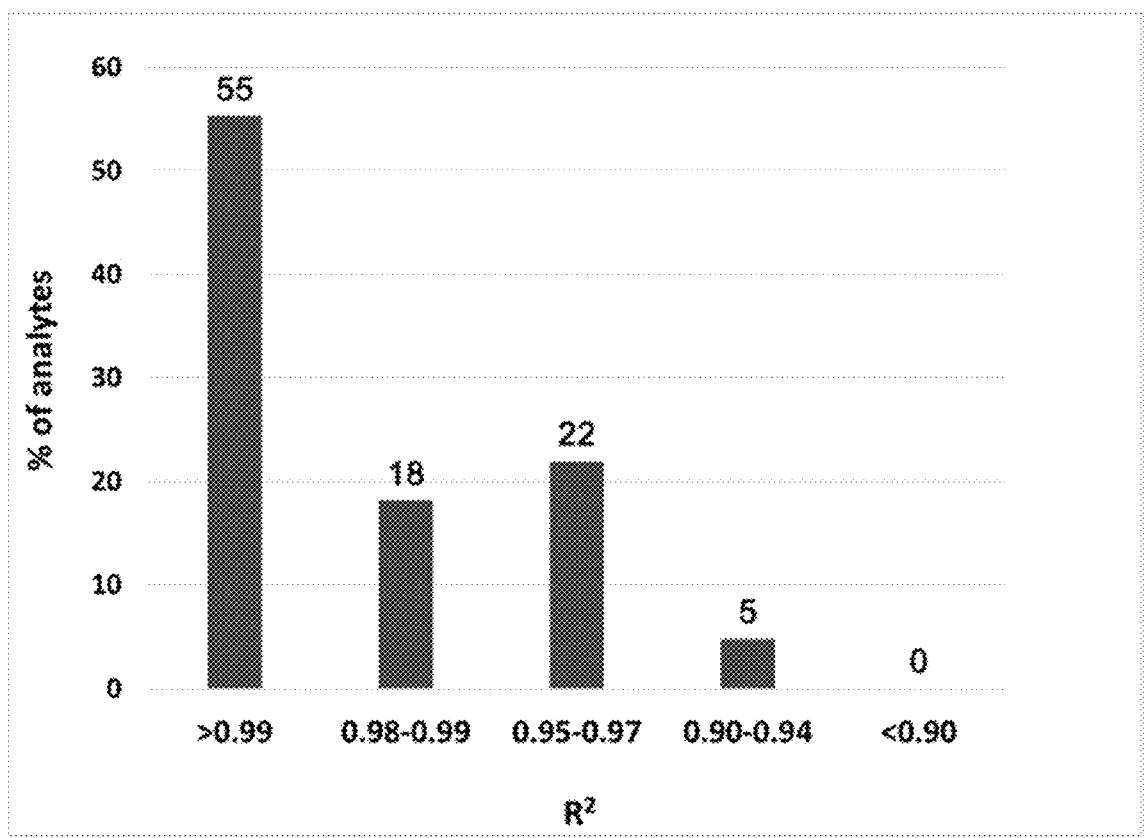
FIG. 4 is a graph summarizing the linearity results for 100 tested analytes.
Figure 5:
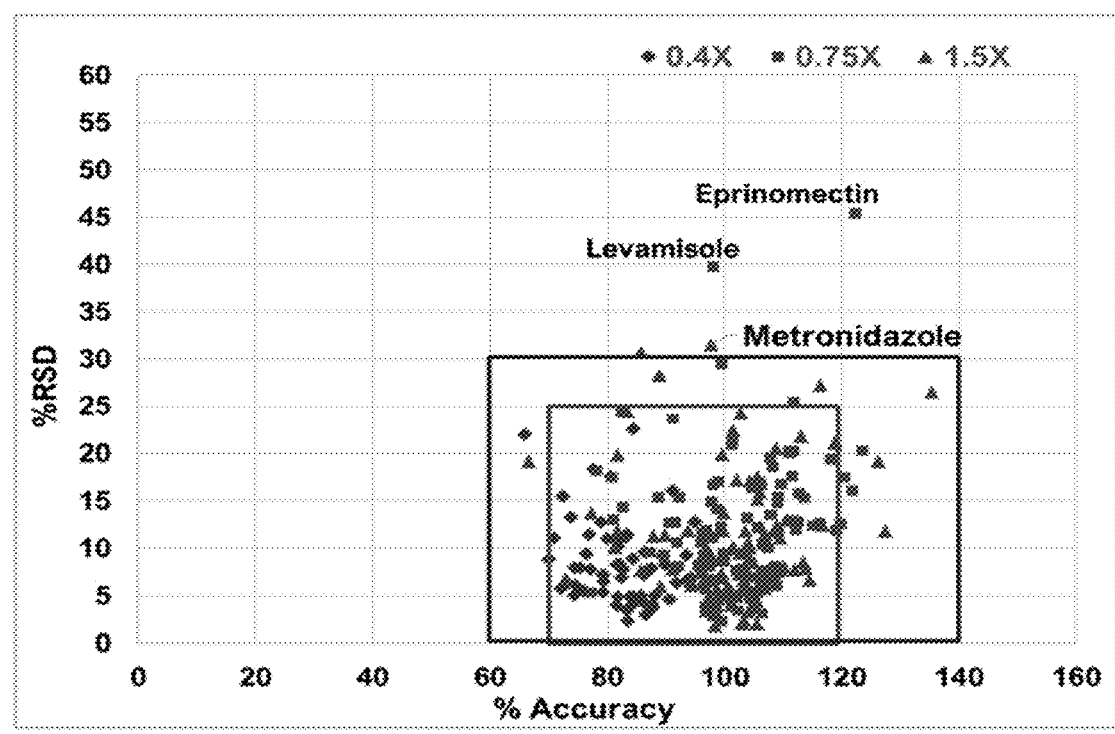
FIG. 5 is a graph summarizing accuracy and repeatability results of the methods for the target analytes fortified at the 0.4, 0.75, and 1.5× concentration levels in bovine tissue, where X is the maximum residue limit (MRL) of analyte allowed in tissue.

FIG. 4 shows the linearity results for 100 compounds expressed in number of compounds corresponding to R2 value ranges and FIG. 5 shows accuracy and repeatability results of the methods for the target analytes fortified at the 0.4, 0.75, and 1.5× concentration level in bovine tissue, n=6, where X is the maximum residue limit (MRL) of analyte allowed in tissue.

Figure 6:
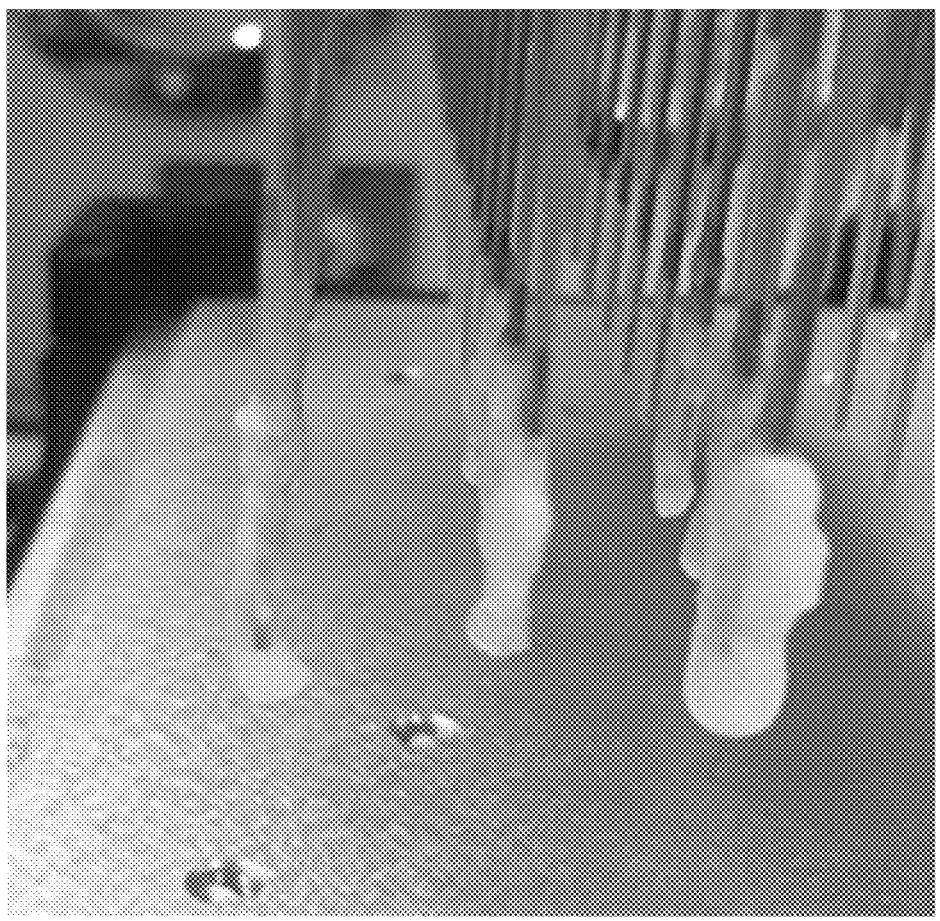
FIG. 6 is a photograph showing tissue debris adhered to the support surface of a coated blade according to the prior art.

FIG. 6 is a photograph showing the adhesion of matrix components onto the bare stainless-steel surface of blades that have not been coated with an undercoated sealing layer.

Examples

Target Analytes.

A total of 114 target analytes, comprising drugs with a wide range of physicochemical properties (log P −1.85- 9.36), were initially selected for this investigation. These analytes include 103 veterinary drugs that were successfully quantified below the regulatory residue limits in a previous report using SPME and liquid chromatography-electrospray ionization-tandem mass spectrometry (UHPLC-ESI-MS/MS) in positive ionization mode. (see Khaled, A.; Singh, V.; Pawliszyn, J. Comparison of Solid-Phase Microextraction to Solvent Extraction and QuEChERS for Quantitative Analysis of Veterinary Drug Residues in Chicken and Beef Matrices. *J. Agric. Food Chem.* 2019, 67, 12663-12669.)

An additional 11 new target analytes that ionize in negative mode were added to this study to evaluate the performance of CBS in negative mode. Further details pertaining to these compounds, including their physicochemical properties, drug classes, supplier information, and ionization mode, can be found in Table 1 and 2 below. Sulfadoxine was also not further investigated in this study as it is an isobar of sulfadimethoxine. All analytes were selected from the list of standards specified in the official method developed by the United States Department of Agriculture for screening and confirmation of animal drug residues (CLG-MRM1.08). (see FSIS-USDA. CLG-MRM1.07. Screening and Confirmation of Animal Drug Residues by UHPLC-MS-MS at www.fsis.usda.gov/wps/wcm/connect/b9d45c8b-74d4-4e99-8eda-5453812eb237/CLG-MRM1.pdf?MOD=AJPERES).

A total of 9 analytes (bolded in Table 1) were excluded from validation studies following final optimization of the multi-residue method due to poor ionization efficiencies at the maximum residue limit (MRL). While the detection limit for these compounds could certainly be improved were they to be analyzed separately, optimized method conditions, including desorption solvent, were mainly targeted at optimizing negative mode compounds due to the complexity of negative ionization, leading to compromised performance of certain compounds with low MRL values. The MRL values, listed in Table 3, were based primarily on Canadian MRL values and US tolerance levels in beef tissues. In general, Canadian MRLs are either equal or lower than US tolerance levels; however, in cases where Canadian MRLs were higher than US tolerance levels, the US regulatory value was selected, as is the case for ketoprofen and morantel. Two isotopically labelled internal standards (IS), namely d5-Enrofloxacin for positive mode analytes and d3-Thiamphenicol for negative mode analytes, were procured from Sigma Aldrich (Oakville, ON, Canada).

TABLE 1

Physicochemical properties, class, and supplier information for analytes under study. LogP data taken from computational predictions ACD/LogP from

| Compound | Supplier | Class | Formula | Mol. Mass (Da) | Log P |
|---|---|---|---|---|---|
| 2-Aminoflubendazole | Sigma-Aldrich | Anthelmintics | $C_{14}H_{10}FN_3O$ | 255.2 | 1.96 |
| 2-Amino mebendazole | Sigma-Aldrich | Anthelmintics | $C_{14}H_{11}N_3O$ | 237.3 | 1.74 |
| 2-Mercapto benzimidazole | Sigma-Aldrich | Anthelmintics | $C_7H_6N_2$ | 150.2 | −0.38 |
| 2-Quinoxaline carboxylic acid | Sigma-Aldrich | Others | $C_9H_6N_2$ | 174.2 | 1.80 |
| 2-Thiouracil | Sigma-Aldrich | Thyreostats | $C_4H_4N_2$ | 128.2 | −1.85 |
| 5-Hydroxy thiabendazole | Sigma-Aldrich | Anthelmintics | $C_{10}H_7N_3OS$ | 217.3 | 1.73 |
| 6-Methyl-2-thiouracil | Sigma-Aldrich | Thyreostats | $C_5H_6N_2$ | 142.2 | 0.31 |
| 6-Phenyl-2-thiouracil | Sigma-Aldrich | Thyreostats | $C_{10}H_8N_2OS$ | 204.3 | −0.10 |
| 6-Propyl-2-thiouracil | Sigma-Aldrich | Thyreostats | $C_7H_{10}N$ | 170.2 | 1.37 |
| Acepromazine Maleate | Sigma-Aldrich | Tranquilizers | $C_{19}H_{22}N_2OS$ | 326.5 | 4.08 |
| Albendazole | Sigma-Aldrich | Anthelmintics | $C_{12}H_{15}N_3O_2S$ | 265.3 | 3.07 |
| Albendazole-2-aminosulfone | Sigma-Aldrich | Anthelmintics | $C_{10}H_{13}N_3O_2S$ | 239.3 | 0.12 |
| Albendazole Sulfone | Sigma-Aldrich | Anthelmintics | $C_{12}H_{15}N_3O_4S$ | 297.1 | 0.86 |
| Albendazole Sulfoxide | Sigma-Aldrich | Anthelmintics | $C_{12}H_{15}N_3O_3S$ | 281.3 | 0.91 |
| Ampicillin | Sigma-Aldrich | β-Lactams/cephalosporins | $C_{16}H_{19}N_3O_4S$ | 349.4 | 1.35 |
| Azaperone | Sigma-Aldrich | Tranquilizers | $C_{19}H_{22}FN_3O$ | 327.4 | 2.50 |
| Bacitracin | Sigma-Aldrich | Others | $C_{66}H_{103}N_{17}O_{16}S$ | 1422.7 | −2.21 |
| Betamethasone | Sigma-Aldrich | Anti-inflammatories | $C_{22}H_{29}FO_5$ | 392.2 | 1.87 |
| Bithionol | Sigma-Aldrich | Anthelmintics | $C_{12}H_6Cl$ | 356.1 | 5.51 |
| Cambendazole | Sigma-Aldrich | Anthelmintics | $C_{14}H_{14}N_4O_2S$ | 302.4 | 2.90 |
| Carazolol | Sigma-Aldrich | Tranquilizers | $C_{18}H_{22}N_2O_2$ | 298.4 | 3.59 |
| Carbadox | Sigma-Aldrich | Others | $C_{11}H_{10}N_4O_4$ | 262.2 | −1.22 |
| Cefazolin | Sigma-Aldrich | β-Lactams/cephalosporins | $C_{14}H_{14}N_8O_4S_3$ | 454.507 | 1.13 |
| Cephapirin | Sigma-Aldrich | β-Lactams/cephalosporins | $C_{17}H_{17}N_3O_6S_2$ | 423.5 | 0.79 |
| Chloramphenicol | Sigma-Aldrich | Phenicols | $C_{11}H_{12}Cl_2N_2O_5$ | 323.1 | 1.02 |
| Chlorpromazine HCl | Sigma-Aldrich | Tranquilizers | $C_{17}H_{20}Cl_2N_2S$ | 355.3 | 5.20 |
| Chlorotetracycline HCl | Sigma-Aldrich | Tetracyclines | $C_{22}H_{24}Cl_2N_2O_8$ | 515.3 | 1.11 |
| Ciprofloxacin | Sigma-Aldrich | Fluoroquinolones | $C_{17}H_{18}FN_3O_3$ | 331.341 | 0.65 |
| Clenbuterol HCl | Sigma-Aldrich | β-Agonists | $C_{12}H_{19}Cl_3N_2O$ | 313.7 | 2.61 |
| Clindamycin HCl | Sigma-Aldrich | Macrolides/lincosamides | $C_{18}H_{34}Cl_2N_2O_5S$ | 461.4 | 1.83 |
| Clorsulon | Sigma-Aldrich | Anthelmintics | $C_8H_8Cl_3N_3O_4S_2$ | 380.7 | 1.04 |
| Closantel | Sigma-Aldrich | Anthelmintics | $C_{22}H_{14}Cl_2I_2N_2O_2$ | 663.1 | 9.08 |
| Cioxacillin Sodium Salt | Sigma-Aldrich | β-Lactams/cephalosporins | $C_{19}H_{17}ClN_3NaO_5S$ | 457.9 | 2.53 |

TABLE 1-continued

Physicochemical properties, class, and supplier information for analytes under study. LogP data taken from computational predictions ACD/LogP from

| Compound | Supplier | Class | Formula | Mol. Mass (Da) | Log P |
|---|---|---|---|---|---|
| Danofloxacin | Sigma-Aldrich | Fluoroquinolones | $C_{19}H_{20}FN_3O_3$ | 357.1 | 1.20 |
| Desacetyl cephapirin | Toronto Research Chemicals | β-Lactams/cephalosporins | $C_{15}H_{15}N_3O_5S_2$ | 381.427 | 0.32 |
| Desethylene ciprofloxacin HCl | Toronto Research Chemicals | Fluoroquinolones | $C_{15}H_{17}ClFN_3O_3$ | 341.8 | −0.14 |
| Diclofenac Sodium | Sigma-Aldrich | Anti-inflammatories | $C_{14}H_{10}Cl_2NNaO_2$ | 318.1 | 4.06 |
| Dicloxacillin Sodium Salt Hydrate | Sigma-Aldrich | β-Lactams/cephalosporins | $C_{19}H_{16}Cl_2N_3NaO_5S \cdot xH_2O$ | 492.3 | 3.02 |
| Difloxacin HCl | Sigma-Aldrich | Fluoroquinolones | $C_{21}H_{20}ClF_2N_3O_3$ | 435.9 | 2.78 |
| Dimetridazole | Sigma-Aldrich | Coccidiostats | $C_5H_7N_3O_2$ | 141.0 | 0.31 |
| Doxycycline HCl | Sigma-Aldrich | Tetracyclines | $C_{22}H_{25}ClN_2O_8$ | 480.9 | −0.54 |
| Emamectin Benzoate | Sigma-Aldrich | Anthelmintics | $C_{56}H_{81}NO_{15}$ | 1008.2 | 6.84 |
| Enrofloxacin | Sigma-Aldrich | Fluoroquinolones | $C_{19}H_{22}FN_3O_3$ | 359.4 | 1.88 |
| Eprinomectin | Sigma-Aldrich | Anthelmintics | $C_{50}H_{75}NO_{14}$ | 914.1 | 6.22 |
| Erythromycin | Sigma-Aldrich | Macrolides/lincosamides | $C_{37}H_{67}NO_{13}$ | 733.9 | 2.83 |
| Fenbendazole Sulfone | Sigma-Aldrich | Anthelmintics | $C_{15}H_{13}N_3O_4S$ | 331.3 | 1.70 |
| Florfenicol | Sigma-Aldrich | Phenicols | $C_{12}H_{14}C_{12}FNO_4S$ | 357.0 | −0.12 |
| Florfenicol amine | Sigma-Aldrich | Phenicols | $C_{10}H_{14}FNO_3S$ | 247.3 | −0.80 |
| Flubendazole | Sigma-Aldrich | Anthelmintics | $C_{16}H_{12}FN_3O_3$ | 313.3 | 3.05 |
| Flunixin | Sigma-Aldrich | Anti-inflammatories | $C_{14}H_{11}F_3N_2O_2$ | 296.2 | 5.40 |
| Gamithromycin | Sigma-Aldrich | Macrolides/lincosamides | $C_{40}H_{76}N_2O_{12}$ | 776.5 | 3.89 |
| Haloperidol | Sigma-Aldrich | Tranquilizers | $C_{21}H_{23}ClFNO_2$ | 375.9 | 3.01 |
| Hydroxy dimetridazole | Toronto Research Chemicals | Coccidiostats | $C_5H_7N_3O_3$ | 157.1 | −0.49 |
| Hydroxy ipronidazole | Sigma-Aldrich | Coccidiostats | $C_7H_{11}N_3O_3$ | 185.2 | 0.21 |
| Hydroxy metronidazole | Sigma-Aldrich | Coccidiostats | $C_6H_9N_3O_4$ | 187.15 | −0.81 |
| Ipronidazole | Sigma-Aldrich | Coccidiostats | $C_7H_{11}N_3O_2$ | 169.2 | 1.18 |
| Ketoprophen | Sigma-Aldrich | Anti-inflammatories | $C_{16}H_{14}O_3$ | 254.3 | 2.81 |
| Lasalocid A | Sigma-Aldrich | Coccidiostats | $C_{34}H_{54}O_8$ | 590.8 | 6.55 |
| Levamisole HCl | Sigma-Aldrich | Anthelmintics | $C_{11}H_{13}ClN_2S$ | 240.8 | 1.85 |
| Lincomycin HCl Monohydrate | Sigma-Aldrich | Macrolides/lincosamides | $C_{18}H_{37}ClN_2O_7S$ | 461.0 | 0.91 |
| Mebendazole | Sigma-Aldrich | Anthelmintics | $C_{16}H_{13}N_3O_3$ | 295.3 | 2.83 |
| Melengestrol Acetate | Sigma-Aldrich | Others | $C_{25}H_{32}O_4$ | 396.5 | 4.21 |
| Meloxicam | Sigma-Aldrich | Anti-inflammatories | $C_{14}H_{13}N_3O_4S_2$ | 351.0 | 2.71 |
| Metamizole | Sigma-Aldrich | Anti-inflammatories | $C_{13}H_{17}N_3O_4S$ | 311.0 | −0.74 |
| Metronidazole | Sigma-Aldrich | Coccidiostats | $C_6H_9N_3O_3$ | 171.2 | −0.01 |
| Morantel Tartrate Hydrate | Sigma-Aldrich | Anthelmintics | $C_{16}H_{22}N_2O_6S \cdot xH_2O$ | 370.4 | 1.97 |
| Nafcillin | Sigma-Aldrich | β-Lactams/cephalosporins | $C_{21}H_{22}N_2O_5S$ | 414.1 | 3.52 |
| Nitroxynil | Sigma-Aldrich | Anthelmintics | $C_7H_3IN_2O_3$ | 290.0 | 2.80 |
| Norfloxacin | Sigma-Aldrich | Fluoroquinolones | $C_{16}H_{18}FN_3O_3$ | 319.3 | 0.82 |
| Novobiocin | Sigma-Aldrich | Novobiocin | $C_{31}H_{36}N_2O_{11}$ | 612.2 | 2.86 |
| Orbifloxacin | Sigma-Aldrich | Fluoroquinolones | $C_{19}H_{20}F_3N_3O_3$ | 395.4 | 2.37 |
| Oxacillin Sodium Salt Monohydrate | Sigma-Aldrich | β-Lactams/cephalosporins | $C_{19}H_{18}N_3O_5SNaH_2O$ | 441.4 | 2.05 |
| Oxfendazole | Sigma-Aldrich | Anthelmintics | $C_{15}H_{13}N_3O_3S$ | 315.3 | 1.36 |
| Oxyclozanide | Sigma-Aldrich | Anthelmintics | $C_{13}H_6Cl_5NO_3$ | 401.5 | 8.67 |
| Oxyphenylbutazone | Sigma-Aldrich | Anti-inflammatories | $C_{19}H_{20}N_2O_3$ | 324.4 | 2.72 |
| Oxytetracycline HCl | Sigma-Aldrich | Tetracyclines | $C_{22}H_{25}ClN_2O_9$ | 496.9 | −1.50 |
| Penicillin G | Toronto Research Chemicals | β-Lactams/cephalosporins | $C_{16}H_{18}N_2O_4S$ | 334.0 | 1.67 |
| Phenylbutazone | Sigma-Aldrich | Anti-inflammatories | $C_{19}H_{20}N_2O_2$ | 308.4 | 3.16 |
| Pirlimycin HCl | Toronto Research Chemicals | Macrolides/lincosamides | $C_{17}H_{32}Cl_2N_2O_5S$ | 447.4 | 1.47 |
| Prednisone | Sigma-Aldrich | Anti-inflammatories | $C_{21}H_{26}O_5$ | 358.4 | 1.57 |
| Promethazine HCl | Sigma-Aldrich | Tranquilizers | $C_{17}H_{21}ClN_2S$ | 320.9 | 4.78 |
| Propionylpromazine Cl | Sigma-Aldrich | Tranquilizers | $C_{20}H_{25}ClN_2OS$ | 376.9 | 4.61 |
| Ractopamine HCl | Sigma-Aldrich | β-Agonists | $C_{18}H_{24}ClNO_3$ | 337.8 | 1.65 |
| Rafoxanide | Sigma-Aldrich | Anthelmintics | $C_{19}H_{11}Cl_2I_2NO_3$ | 626.0 | 9.36 |
| Ronidazole | Sigma-Aldrich | Coccidiostats | $C_6H_8N_4O_4$ | 200.0 | −0.45 |
| Salbutamol | Sigma-Aldrich | β-Agonists | $C_{13}H_{21}NO_3$ | 239.1 | 0.01 |
| Sarafloxacin HCl Hydrate | Sigma-Aldrich | Fluoroquinolones | $C_{20}H_{17}F_2N_3O_3 \cdot HCl \cdot xH_2O$ | 421.8 | 2.09 |
| Sulfachloropyridazine | Sigma-Aldrich | Sulfonamides | $C_{10}H_9ClN_4O_2S$ | 284.7 | 1.02 |
| Sulfadiazine | Sigma-Aldrich | Sulfonamides | $C_{10}H_{10}N_4O_2S$ | 250.277 | −0.12 |
| Sulfadimethoxine | Sigma-Aldrich | Sulfonamides | $C_{12}H_{14}N_4O_4S$ | 310.3 | 1.48 |

TABLE 1-continued

Physicochemical properties, class, and supplier information for analytes under study. LogP data taken from computational predictions ACD/LogP from

| Compound | Supplier | Class | Formula | Mol. Mass (Da) | Log P |
|---|---|---|---|---|---|
| Sulfadoxine | Sigma-Aldrich | Sulfonamides | $C_{12}H_{14}N_4O_4S$ | 310.3 | 0.34 |
| Sulfaethoxy pyridazine | Sigma-Aldrich | Sulfonamides | $C_{12}H_{14}N_4O_3S$ | 294.3 | 0.85 |
| Sulfamerazine | Sigma-Aldrich | Sulfonamides | $C_{11}H_{12}N_4O_2S$ | 264.0 | 0.34 |
| Sulfamethazine | Sigma-Aldrich | Sulfonamides | $C_{12}H_{14}N_4O_2S$ | 278.0 | 0.80 |
| Sulfamethizole | Sigma-Aldrich | Sulfonamides | $C_9H_{10}N_4O_2S_2$ | 270.0 | 0.51 |
| Sulfamethoxazole | Sigma-Aldrich | Sulfonamides | $C_{10}H_{11}N_3O_3S$ | 253.0 | 0.89 |
| Sulfamethoxy pyridazine | Sigma-Aldrich | Sulfonamides | $C_{11}H_{12}N_4O_3S$ | 280.3 | 0.32 |
| Sulfanitran | Sigma-Aldrich | Sulfonamides | $C_{14}H_{13}N_3O_5S$ | 335.3 | 2.98 |
| Sulfapyridine | Sigma-Aldrich | Sulfonamides | $C_{11}H_{11}N_3O_2S$ | 249.3 | 0.03 |
| Sulfaquinoxaline | Sigma-Aldrich | Sulfonamides | $C_{14}H_{12}N_4O_2S$ | 300.0 | 1.30 |
| Sulfathiazole | Sigma-Aldrich | Sulfonamides | $C_9H_9N_3O_2S_2$ | 255.3 | 0.05 |
| Tetracycline HCl | Sigma-Aldrich | Tetracyclines | $C_{22}H_{25}ClN_2O_8$ | 480.9 | −1.47 |
| Thiabendazole | Sigma-Aldrich | Anthelmintics | $C_{10}H_7N_3S$ | 201.0 | 2.47 |
| Thiamphenicol | Sigma-Aldrich | Phenicols | $C_{12}H_{15}C_{12}NO_5S$ | 356.2 | −0.27 |
| Tildipirosin | Sigma-Aldrich | Macrolides/lincosamides | $C_{41}H_{71}N_3O_8$ | 733.5 | 4.70 |
| Tilmicosin | Sigma-Aldrich | Macrolides/lincosamides | $C_{46}H_{80}N_2O_{13}$ | 868.5 | 4.95 |
| Tolfenamic acid | Sigma-Aldrich | Anti-inflammatories | $C_{14}H_{12}ClNO_2$ | 261.7 | 5.76 |
| Triclabendazole | Sigma-Aldrich | Anthelmintics | $C_{14}H_9Cl_3N_2OS$ | 359.7 | 5.97 |
| Triclabendazole Sulfoxide | Sigma-Aldrich | Anthelmintics | $C_{14}H_9Cl_3N_2O_2S$ | 375.7 | 4.12 |
| Triflupromazine HCl | Sigma-Aldrich | Tranquilizers | $C_{18}H_{20}ClF_3N_2S$ | 388.9 | 5.70 |
| Tulathromycin | Toronto Research Chemicals | Macrolides/lincosamides | $C_{41}H_{79}N_3O_{12}$ | 805.5 | 4.07 |
| Tylosin | Toronto Research Chemicals | Macrolides/lincosamides | $C_{46}H_{77}NO_{17}$ | 916.1 | 3.27 |
| Virginiamycin $M_1$ | Sigma-Aldrich | Others | $C_{28}H_{35}N_3O_7$ | 525.6 | −0.66 |
| Xylazine Cl | Sigma-Aldrich | Tranquilizers | $C_{12}H_{17}ClN_2S$ | 256.8 | 2.37 |

TABLE 2

MS/MS optimized parameters, (m/z); ions used for quantification are bolded

| Compound | Precursor ion (m/z) | Product ions (m/z) | Collision Energy (eV) | S-Lens value | Polarity |
|---|---|---|---|---|---|
| 2-Aminoflubendazole | 256 | 95, 123 | 37, 27 | 93 | + |
| 2-Amino mebendazole | 238 | 77, 105 | 25, 34 | 88 | + |
| 2-Mercaptobenzimidazole | 151 | 93, 118 | 23, 25 | 70 | + |
| 2-Quinoxalinecarboxylic acid | 175 | 104, 131 | 22, 29 | 191 | + |
| 5-Hydroxythiabendazole | 218 | 147, 191 | 26, 32 | 85 | + |
| 2-Thiouracil | 127 | 42, 58 | 33, 16 | 34 | − |
| 6-Phenyl-2-thiouracil | 205 | 103, 188 | 17, 26 | 69 | + |
| 6-Propyl-2-thiouracil | 171 | 112, 154 | 17, 19 | 57 | + |
| Acepromazine Maleate | 327 | 86, 254 | 19, 23 | 65 | + |
| Albendazole | 266 | 191, 234 | 19, 32 | 71 | + |
| Albendazole sulfone | 298 | 159, 266 | 19, 36 | 79 | + |
| Albendazole sulfoxide | 282 | 240, 208 | 10, 23 | 75 | + |
| Albendazole-2-aminosulfone | 240 | 133, 198 | 28, 19 | 75 | + |
| Amoxicillin | 366 | 114, 349 | 10, 20 | 48 | + |
| Ampicillin | 350 | 106, 160 | 18, 10 | 54 | + |
| Azaperone | 328 | 123, 165 | 20, 29 | 66 | + |
| Bacitracin | 475 | 199, 669 | 24, 10 | 74 | + |
| Betamethasone | 393 | 325, 373 | 14, 12 | 59 | + |
| Bithionol | 355 | 161, 192 | 22, 24 | 72 | − |
| Cambendazole | 303 | 217, 261 | 27, 17 | 66 | + |
| Carazolol | 299 | 116, 222 | 19, 19 | 63 | + |
| Carbadox | 263 | 231, 245 | 10, 16 | 67 | + |
| Cephapirin | 424 | 152, 292 | 14, 22 | 66 | + |
| Cefazolin | 455 | 323, 333 | 10, 19 | 72 | + |
| Chloramphenicol | 321 | 152, 257 | 16, 10 | 53 | − |
| Chlorotetracycline HCl | 479 | 444, 462 | 17, 19 | 70 | + |
| Chlorpromazine HCl | 319 | 58, 86 | 19, 30 | 63 | + |
| Ciprofoxacin | 332 | 288, 314 | 17, 19 | 72 | + |
| Clenbuterol HCl | 277 | 168, 203 | 16, 29 | 47 | + |
| Clindamycin HCl | 425 | 126, 377 | 27, 18 | 78 | + |
| Clorsulon | 380 | 342, 344 | 10, 12 | 46 | − |
| Closantel | 661 | 315, 345 | 32, 35 | 207 | − |
| Cloxacillin Sodium Salt | 436 | 160, 277 | 12, 10 | 56 | + |

TABLE 2-continued

MS/MS optimized parameters, (m/z); ions used for quantification are bolded

| Compound | Precursor ion (m/z) | Product ions (m/z) | Collision Energy (eV) | S-Lens value | Polarity |
|---|---|---|---|---|---|
| Danofloxacin | 358 | 314, 340 | 21, 17 | 80 | + |
| Desacetyl cephapirin | 382 | 226, 292 | 10, 17 | 73 | + |
| Desethylene Ciprofloxacin HCl | 306 | 268, 288 | 17, 24 | 67 | + |
| Diclofenac Sodium | 296 | 214, 277 | 33, 11 | 112 | + |
| Dicloxacillin Sodium Salt Hydrate | 470 | 212, 355 | 16, 26 | 124 | + |
| Difloxacin HCl | 400 | 356, 382 | 21, 18 | 82 | + |
| Dimetridazole | 142 | 96, 101 | 16, 10 | 38 | + |
| Doxycycline HCl | 445 | 321, 428 | 30, 17 | 66 | + |
| Emamectin Benzoate | 887 | 158, 868 | 33, 21 | 120 | + |
| Enrofloxacin | 360 | 316, 342 | 20, 18 | 79 | + |
| Eprinomectin | 937 | 490, 504 | 79, 50 | 164 | + |
| Erythromycin | 735 | 522, 558 | 17, 34 | 85 | + |
| Fenbendazole Sulfone | 332 | 159, 300 | 21, 37 | 81 | + |
| Florfenicol | 357 | 182, 198 | 14, 16 | 73 | + |
| Florfenicol amine | 248 | 151, 230 | 10, 25 | 50 | + |
| Flubendazole | 314 | 123, 282 | 22, 35 | 80 | + |
| Flunixin | 297 | 264, 279 | 22, 33 | 75 | + |
| Gamithromycin | 778 | 601, 619 | 28, 31 | 121 | + |
| Haloperidol | 376 | 123, 165 | 22, 36 | 78 | + |
| Hydroxy dimetridazole | 158 | 80, 140 | 10, 10 | 30 | + |
| Hydroxy ipronidazole | 186 | 122, 168 | 10, 19 | 37 | + |
| Hydroxy metronidazole | 188 | 123, 126 | 10, 17 | 47 | + |
| Ipronidazole | 170 | 109, 124 | 17, 24 | 54 | + |
| Ketoprophen | 255 | 105, 209 | 14, 23 | 59 | + |
| Lasalocid A | 589 | 235, 571 | 30, 28 | 113 | − |
| Levamisole HCl | 205 | 123, 178 | 21, 28 | 66 | + |
| Lincomycin HCl Monohydrate | 407 | 126, 359 | 26, 18 | 76 | + |
| Mebendazole | 296 | 105, 264, | 20, 33 | 75 | + |
| Melengestrol Acetate | 397 | 279, 337 | 20, 13 | 88 | + |
| Meloxicam | 352 | 115, 141 | 19, 20 | 67 | + |
| Metamizole | 218 | 56, 97 | 17, 12 | 47 | + |
| Metronidazole | 172 | 82, 128 | 14, 23 | 48 | + |
| Morantel Tartrate Hydrate | 221 | 123, 111 | 35, 25 | 73 | + |
| Nafcillin | 415 | 171, 199 | 14, 34 | 78 | + |
| Nitroxynil | 289 | 127, 192 | 27, 20 | 99 | − |
| Norfloxacin | 320 | 276, 302 | 20, 17 | 76 | + |
| Novobiocin | 613 | 218, 396 | 13, 15 | 80 | + |
| Orbifloxacin | 396 | 295, 352 | 17, 23 | 83 | + |
| Oxacillin Sodium Salt Monohydrate | 402 | 160, 243 | 13, 11 | 68 | + |
| Oxfendazole | 316 | 191, 284 | 20, 18 | 68 | + |
| Oxyclozanide | 400 | 364, 382 | 17, 22 | 84 | − |
| Oxyphenylbutazone | 325 | 160, 162 | 20, 19 | 69 | + |
| Oxytetracycline HCl | 461 | 426, 443 | 18, 10 | 67 | + |
| Penicillin G | 335 | 202, 217 | 14, 23 | 80 | + |
| Phenylbutazone | 309 | 120, 160 | 42, 19 | 71 | + |
| Pirlimycin HCl | 411 | 112, 363 | 16, 25 | 77 | + |
| Prednisone | 359 | 237, 341 | 10, 19 | 65 | + |
| Promethazine HCl | 285 | 86, 198 | 17, 25 | 46 | + |
| Propionylpromazine HCl | 341 | 58, 268 | 30, 23 | 68 | + |
| Ractopamine HCl | 302 | 164, 284 | 15, 10 | 53 | + |
| Rafoxanide | 624 | 345, 513 | 32, 36 | 188 | − |
| Ronidazole | 201 | 140, 55 | 10, 21 | 30 | + |
| Salbutamol | 240 | 148, 222 | 17, 10 | 42 | + |
| Sarafloxacin HCl Hydrate | 386 | 342, 368 | 18, 21 | 85 | + |
| Sulfachloropyridazine | 285 | 108, 156 | 16, 24 | 57 | + |
| Sulfadiazin | 251 | 92, 108 | 24, 22 | 48 | + |
| Sulfadimethoxine | 311 | 108, 156 | 20, 27 | 72 | + |
| Sulfaethoxypyridazine | 295 | 108, 140 | 25, 18 | 64 | + |
| Sulfamerazine | 265 | 108, 172 | 16, 24 | 59 | + |
| Sulfamethazine | 279 | 156, 186 | 17, 18 | 65 | + |
| Sulfamethizole | 271 | 92, 108 | 24, 22 | 47 | + |
| Sulfamethoxazole | 254 | 108, 156 | 23, 15 | 154 | + |
| Sulfamethoxypyridazine | 281 | 108, 156 | 16, 24 | 63 | + |
| Sulfanitran | 334 | 198, 270 | 28, 24 | 94 | − |
| Sulfapyridine | 250 | 108, 184 | 24, 18 | 57 | + |
| Sulfaquinoxaline | 301 | 108, 156 | 17, 25 | 69 | + |
| Sulfathiazole | 256 | 108, 156 | 15, 22 | 52 | + |
| Tetracycline HCl | 445 | 410, 154 | 18, 10 | 67 | + |
| Thiabendazole | 202 | 131, 175 | 25, 32 | 74 | + |
| Thiamphenicol | 354 | 185, 290 | 19, 13 | 77 | − |
| Tildipirosin | 368 | 88, 98 | 28, 19 | 64 | + |
| Tilmicosin | 435 | 174, 695 | 23, 16 | 75 | + |
| Tolfenamic Acid | 262 | 209, 244 | 15, 27 | 47 | + |
| Triclabendazole | 359 | 274, 344 | 37, 25 | 101 | + |

TABLE 2-continued

MS/MS optimized parameters, (m/z); ions used for quantification are bolded

| Compound | Precursor ion (m/z) | Product ions (m/z) | Collision Energy (eV) | S-Lens value | Polarity |
|---|---|---|---|---|---|
| Triclabendazole Sulfoxide | 375 | 357, 360 | 17, 21 | 79 | + |
| Triflupromazine HCl | 353 | 86, 248 | 42, 20 | 68 | + |
| Tulathromycin | 404 | 72, 230 | 19, 10 | 62 | + |
| Tylosin | 917 | 174, 772 | 27, 35 | 134 | + |
| Virginiamycin | 526 | 355, 508 | 12, 17 | 72 | + |
| Xylazine HCl | 221 | 90, 147 | 22, 23 | 68 | + |
| Enrofloxacin-d5 | 365 | 321 | 19 | 149 | + |
| Thiamphenicol-d3 | 357 | 188 | 19 | 68 | − |

TABLE 3

Figures of merit for the quantitation of multi-residue veterinary drugs in beef tissue via undercoated CBS-MS/MS

| Compound | MRL ngg⁻¹ | R² | LOQ | % Accuracy (n = 6) 0.4X | 0.75X | 1.5X | % Repeatability (n = 6) 0.4X | 0.75X |
|---|---|---|---|---|---|---|---|---|
| 2-amino mebendazole | 10 | 0.9931 | 0.5X | | 108 | 98 | | 19 |
| 2-Aminoflubendazole | 10 | 0.9932 | 0.5X | | 110 | 97 | | 17 |
| 2-Mercapto benzimidazole | 25 | 0.9768 | 1X | | | 67 | | |
| 2-Thiouracil | 400 | 0.9448 | 1X | | | 116 | | |
| 5-Hydroxy thiabendazole | 100 | 0.9809 | 0.5X | | 107 | 107 | | 7 |
| 6-phenyl-thiouracil | 400 | 0.9824 | 0.75X | | 105 | 102 | | 16 |
| 6-propyl-2-thiouracil | 50 | 0.9934 | 0.75X | | | 109 | | |
| Acepromazine | 10 | 0.9884 | 0.5X | | 108 | 91 | | 7 |
| Albendazole | 50 | 0.9714 | 0.5X | | 119 | 101 | | 12 |
| Albendazole 2-aminosulfone | 50 | 0.9961 | 0.25X | 79 | 92 | 97 | 7 | 11 |
| Albendazole sulfone | 50 | 0.9967 | 0.25X | 83 | 107 | 114 | 3 | 10 |
| Albendazole sulfoxide | 50 | 0.9965 | 0.25X | 76 | 102 | 110 | 6 | 5 |
| Azaperone | 10 | 0.9932 | 0.25X | 77 | 104 | 98 | 8 | 5 |
| Betamethasone | 100 | 0.9980 | 0.25X | 94 | 111 | 113 | 7 | 18 |
| Bithionol | 10 | 0.9827 | 0.5X | | 91 | 113 | | 24 |
| Cambendazole | 10 | 0.9946 | 0.5X | | 108 | 101 | | 8 |
| Carazolol | 10 | 0.9924 | 0.25X | 86 | 103 | 98 | 4 | 8 |
| Carbadox | 30 | 0.9984 | 0.25X | 79 | 96 | 99 | 7 | 7 |
| Cefazolin | 100 | 0.9904 | 0.5X | | 109 | 100 | | 8 |
| Cephapirin | 100 | 0.9250 | 0.25X | 97 | 98 | 73 | 11 | 17 |
| Chloramphenicol | 10 | 0.9950 | 0.5X | | 104 | 104 | | 5 |
| Chlorotetracycline | 200 | 0.9986 | 0.25X | 82 | 98 | 104 | 8 | 15 |
| Chlorpromazine | 10 | 0.9605 | 0.5X | 90 | 99 | 86 | 10 | 12 |
| Chlorsulon | 100 | 0.9577 | 1X | | | 100 | | |
| Cimaterol | 10 | 0.9755 | 0.5X | | 98 | 81 | | 11 |
| Ciprofloxacin | 50 | 0.9983 | 0.25X | 79 | 90 | 97 | 5 | 9 |
| Clenbuterol | 10 | 0.9909 | 0.25X | 79 | 96 | 96 | 13 | 9 |
| Clindamycin | 100 | 0.9860 | 0.25X | 83 | 97 | 97 | 8 | 9 |
| Closantel | 50 | 0.9899 | 1X | | | 135 | | |
| Cloxacillin | 10 | 0.9792 | 0.25X | 91 | 118 | 106 | 16 | 19 |
| Danofloxacin | 70 | 0.9982 | 0.25X | 73 | 92 | 99 | 6 | 8 |
| Desacetyl Cephapirin | 100 | 0.9988 | 0.25X | 88 | 91 | 90 | 8 | 13 |
| Desethylene Ciprofloxacin | 100 | 0.9987 | 0.25X | 77 | 89 | 96 | 11 | 15 |
| Diclofenac | 200 | 0.9800 | 0.25X | 90 | 108 | 103 | 8 | 20 |
| Dicloxacillin | 100 | 0.9713 | 0.5X | 94 | 111 | 97 | 12 | 20 |
| Difloxacin | 100 | 0.9988 | 0.25X | 88 | 104 | 97 | 5 | 5 |
| Dimetridazole | 50 | 0.9948 | 0.25X | 83 | 81 | 82 | 11 | 17 |
| Doxycycline | 100 | 0.9971 | 0.25X | 86 | 104 | 104 | 7 | 13 |
| Emamectin | 10 | 0.9798 | 0.5X | 84 | 120 | 94 | 18 | 13 |
| Enrofloxacin | 20 | 0.9997 | 0.25X | 83 | 99 | 98 | 2 | 2 |
| Eprinomectin | 100 | 0.9812 | 0.75X | | | 83 | | |
| Erythromycin | 100 | 0.9929 | 0.25X | 80 | 106 | 99 | 11 | 17 |
| Fenbendazole Sulfone | 400 | 0.9956 | 0.25X | 93 | 112 | 107 | 9 | 13 |
| Flubendazole | 10 | 0.9869 | 0.25X | 95 | 109 | 107 | 13 | 15 |
| Flunixin | 20 | 0.9900 | 0.5X | | 112 | 97 | | 20 |
| Gamithromycin | 20 | 0.9814 | 0.25X | 81 | 111 | 107 | 18 | 20 |
| Haloperidol | 10 | 0.9850 | 0.5X | | 105 | 94 | | 5 |
| Hydroxy ipronidazole | 10 | 0.9445 | 0.5X | | 98 | 88 | | 11 |

TABLE 3-continued

| Compound | | | | | | | | |
|---|---|---|---|---|---|---|---|---|
| Ipronidazole | 10 | 0.9762 | 0.25X | 82 | 101 | 104 | 10 | 21 |
| Ketoprofen | 10 | 0.9760 | 0.5X | | 112 | 101 | | 12 |
| Lasalocid A | 1000 | 0.9791 | 0.5X | | 112 | 104 | | 25 |
| Levamisole | 100 | 0.9361 | | | 98 | 89 | | 40 |
| Lincomycin | 100 | 0.9977 | 0.25X | 74 | 87 | 97 | 13 | 10 |
| Mebendazole | 10 | 0.9892 | 0.25X | 91 | 108 | 106 | 8 | 14 |
| Melengestrol Acetate | 25 | 0.9508 | 0.5X | | 119 | 105 | | 12 |
| Meloxicam | 20 | 0.9924 | 0.5X | | 106 | 106 | | 11 |
| Metamizole | 200 | 0.9675 | 0.25X | 66 | 78 | 77 | 22 | 18 |
| Metronidazole | 10 | 0.9641 | 0.5X | | 81 | 98 | | 13 |
| Morantel | 100 | 0.9757 | 0.25X | 78 | 106 | 102 | 18 | 12 |
| Nafcillin | 100 | 0.9922 | 0.25X | 92 | 115 | 112 | 6 | 12 |
| Nitroxynil | 50 | 0.9787 | 0.5X | 107 | 99 | 101 | | 14 |
| Norfloxacin | 50 | 0.9997 | 0.25X | 82 | 92 | 97 | 8 | 13 |
| Novobiocin | 1000 | 0.9727 | 0.5X | | 109 | 97 | | 15 |
| Orbifloxacin | 50 | 0.9969 | 0.25X | 86 | 97 | 97 | 5 | 4 |
| Oxacillin | 100 | 0.9819 | 0.25X | 88 | 120 | 127 | 4 | 18 |
| Oxfendazole | 800 | 0.9923 | 0.25X | 94 | 107 | 101 | 7 | 11 |
| Oxyclozanide | 10 | 0.9455 | 1X | | | 119 | | |
| Oxyphenylbutazone | 100 | 0.9820 | 0.5X | 95 | 113 | 109 | 9 | 16 |
| Oxytetracycline | 200 | 0.9995 | 0.25X | 82 | 96 | 104 | 11 | 11 |
| Phenylbutazone | 100 | 0.9903 | 0.5X | | 116 | 101 | | 13 |
| Pirlimycin | 300 | 0.9902 | 0.25X | 72 | 92 | 106 | 15 | 15 |
| Prednisone | 100 | 0.9940 | 0.25X | 94 | 114 | 117 | 7 | 15 |
| Promethazine | 10 | 0.9905 | 0.5X | | 110 | 89 | | 8 |
| Propionylpromazine | 10 | 0.9812 | 0.5X | 65 | 101 | 111 | | 21 |
| Ractopamine | 30 | 0.9961 | 0.25X | 83 | 95 | 99 | 11 | 8 |
| Rafoxanide | 10 | 0.9589 | 1X | | | 126 | | |
| Ronidazole | 10 | 0.9581 | 0.75X | | 82 | 86 | | 24 |
| Salbutamol | 10 | 0.9874 | 0.25X | 72 | 83 | 82 | 6 | 14 |
| Sarafloxacin | 50 | 0.9978 | 0.25X | 86 | 96 | 94 | 3 | 12 |
| Sulfachloropyridazine | 100 | 0.9948 | 0.25X | 84 | 106 | 109 | 5 | 8 |
| Sulfadiazin | 100 | 0.9913 | 0.25X | 76 | 97 | 100 | 9 | 12 |
| Sulfadimethoxine | 100 | 0.9951 | 0.25X | 84 | 106 | 103 | 4 | 3 |
| Sulfaethoxypyridazine | 100 | 0.9908 | 0.25X | 88 | 106 | 104 | 4 | 5 |
| Sulfamerazine | 100 | 0.9910 | 0.25X | 74 | 100 | 104 | 5 | 9 |
| Sulfamethazine | 100 | 0.9902 | 0.25X | 75 | 102 | 105 | 6 | 8 |
| Sulfamethizole | 100 | 0.9923 | 0.25X | 84 | 105 | 103 | 5 | 4 |
| Sulfamethoxazole | 100 | 0.9966 | 0.25X | 82 | 105 | 108 | 4 | 7 |
| Sulfamethoxy pyridazine | 100 | 0.9923 | 0.25X | 82 | 102 | 104 | 5 | 3 |
| Sulfanitran | 10 | 0.9773 | 0.25X | 109 | 109 | 114 | 12 | 12 |
| Sulfapyridine | 100 | 0.9901 | 0.25X | 74 | 98 | 103 | 8 | 7 |
| Sulfaquinoxaline | 100 | 0.9941 | 0.25X | 91 | 108 | 107 | 5 | 14 |
| Sulfathiazole | 100 | 0.9902 | 0.25X | 82 | 99 | 99 | 7 | 5 |
| Tetracycline | 200 | 0.9903 | 0.25X | 86 | 97 | 99 | 10 | 8 |
| Thiabendazole | 100 | 0.9963 | 0.25X | 87 | 109 | 101 | 8 | 6 |
| Thiamphenicol | 10 | 0.9986 | 0.25X | 83 | 101 | 102 | 8 | 5 |
| Tildipirosin | 400 | 0.9855 | 0.25X | 70 | 99 | 106 | 9 | 17 |
| Tilmicosin | 100 | 0.9974 | 0.25X | 84 | 100 | 103 | 9 | 9 |
| Tolfenamic acid | 200 | 0.9653 | 1X | | | 103 | | |
| Triclabendazole | 50 | 0.9707 | 0.75X | | 123 | 109 | | 20 |
| Triclabendazole Sulfoxide | 50 | 0.9934 | 1X | | | 106 | | |
| Trifluropromazine | 10 | 0.9881 | 0.25X | 84 | 122 | 100 | 23 | 16 |
| Tulathromycin | 1000 | 0.9878 | 0.25X | 71 | 99 | 100 | 11 | 30 |
| Tylosin | 200 | 0.9935 | 0.25X | 75 | 106 | 103 | 8 | 17 |
| Virginiamycin | 100 | 0.9958 | 0.25X | 89 | 113 | 103 | 9 | 13 |
| Xylazine | 10 | 0.9986 | 0.5X | | 98 | 99 | | 3 |

| Compound | % Repeatability (n = 6) 1.5X | % Matrix Effects | Ion Ratio Average (all concentrations) | | % Deviation | % Ion Ratio Deviation Matrix | | |
|---|---|---|---|---|---|---|---|---|
| | | | Reagent | Matrix | | 0.75X | 1X | 1.5X |
| 2-amino mebendazole | 7 | −52 | 0.98 | 0.91 | −7 | −7 | −9 | −3 |
| 2-Aminoflubendazole | 7 | −55 | 0.19 | 0.12 | −37 | −36 | −35 | −52 |
| 2-Mercapto benzimidazole | 19 | 167 | 0.04 | 0.11 | 171 | 162 | 161 | 153 |
| 2-Thiouracil | 27 | 92 | 0.08 | 0.03 | −66 | −61 | −74 | −63 |
| 5-Hydroxy thiabendazole | 6 | −43 | 0.80 | 0.80 | 0 | 1 | 1 | −1 |
| 6-phenyl-thiouracil | 17 | −36 | 0.68 | 3.42 | 403 | 601 | 538 | 268 |
| 6-propyl-2-thiouracil | 12 | 175 | 0.60 | 0.62 | 3 | 3 | 2 | 8 |
| Acepromazine | 8 | −46 | 0.14 | 0.14 | 0 | 5 | −4 | −1 |
| Albendazole | 5 | −48 | 0.44 | 0.44 | 0 | −2 | 1 | 1 |
| Albendazole 2-aminosulfone | 10 | −36 | 0.40 | 0.37 | −9 | −10 | −9 | −3 |

TABLE 3-continued

| | | | | | | | | |
|---|---|---|---|---|---|---|---|---|
| Albendazole sulfone | 8 | −53 | 0.93 | 0.92 | −1 | −1 | −1 | −1 |
| Albendazole sulfoxide | 8 | −55 | 0.98 | 0.98 | 1 | 1 | −1 | 2 |
| Azaperone | 9 | −33 | 0.83 | 0.83 | 0 | 2 | −1 | 0 |
| Betamethasone | 9 | −57 | 0.06 | 0.06 | 5 | 7 | 14 | −3 |
| Bithionol | 22 | 21 | 0.89 | 0.86 | −4 | 1 | −3 | −7 |
| Cambendazole | 4 | −48 | 0.74 | 0.75 | 2 | 0 | 1 | 1 |
| Carazolol | 7 | −61 | 0.45 | 0.46 | 3 | 4 | 3 | 1 |
| Carbadox | 6 | −55 | 0.69 | 0.72 | 4 | 8 | −2 | −16 |
| Cefazolin | 9 | −66 | 0.05 | 0.11 | 130 | 132 | 126 | 84 |
| Cephapirin | 7 | −72 | 0.49 | 0.49 | 1 | 3 | 1 | 0 |
| Chloramphenicol | 7 | 17 | 0.93 | 1.18 | 27 | 16 | 30 | 3 |
| Chlorotetracycline | 10 | −29 | 0.01 | 0.01 | −6 | 1 | −12 | −14 |
| Chlorpromazine | 8 | −43 | 0.47 | 0.44 | −5 | −2 | −4 | −2 |
| Chlorsulon | 12 | −35 | 0.43 | 0.40 | −8 | −7 | −5 | −5 |
| Cimaterol | 10 | −57 | 0.59 | 0.51 | −13 | −14 | −11 | −8 |
| Ciprofloxacin | 6 | −35 | 0.81 | 1.15 | 42 | 34 | 49 | 40 |
| Clenbuterol | 6 | −60 | 0.33 | 0.31 | −6 | −9 | −4 | 0 |
| Clindamycin | 9 | −16 | 0.09 | 0.09 | −1 | −2 | −1 | −1 |
| Closantel | 26 | −17 | 0.84 | 0.85 | 1 | −1 | 1 | 5 |
| Cloxacillin | 16 | −62 | 0.69 | 0.57 | −18 | −19 | −10 | −15 |
| Danofloxacin | 5 | −1 | 0.22 | 0.21 | −5 | −12 | −5 | −5 |
| Desacetyl Cephapirin | 11 | −71 | 0.82 | 0.83 | 1 | 4 | 0 | −4 |
| Desethylene Ciprofloxacin | 11 | −20 | 0.28 | 0.27 | −3 | −3 | −3 | 0 |
| Diclofenac | 10 | −75 | 0.22 | 0.62 | 182 | 187 | 156 | 81 |
| Dicloxacillin | 10 | −69 | 0.31 | 0.18 | −42 | −50 | −39 | −11 |
| Difloxacin | 4 | −42 | 0.90 | 0.85 | −5 | −8 | −5 | 1 |
| Dimetridazole | 20 | −30 | 0.49 | 0.35 | −30 | −41 | −19 | −18 |
| Doxycycline | 11 | 30 | 0.10 | 0.11 | 7 | 7 | 8 | 7 |
| Emamectin | 12 | −50 | 0.06 | 0.14 | 140 | 151 | 129 | 46 |
| Enrofloxacin | 2 | −33 | 0.55 | 1.25 | 127 | 125 | 125 | 132 |
| Eprinomectin | 24 | −50 | 0.13 | 0.18 | 34 | 27 | 27 | 3 |
| Erythromycin | 7 | −38 | 0.73 | 0.67 | −8 | −9 | −7 | −9 |
| Fenbendazole Sulfone | 6 | −62 | 0.54 | 0.54 | −1 | 0 | −1 | −1 |
| Flubendazole | 6 | −64 | 0.31 | 0.33 | 4 | 2 | 5 | 1 |
| Flunixin | 5 | −55 | 0.35 | 0.34 | −3 | −3 | −2 | 0 |
| Gamithromycin | 10 | −33 | 0.19 | 0.19 | −2 | 1 | −2 | 2 |
| Haloperidol | 7 | −51 | 0.98 | 0.99 | 1 | 1 | 2 | 1 |
| Hydroxy ipronidazole | 11 | −42 | 0.34 | 0.39 | 14 | 11 | 15 | 13 |
| Ipronidazole | 17 | −29 | 0.91 | 0.98 | 8 | 6 | 6 | 5 |
| Ketoprofen | 10 | −44 | 0.52 | 0.49 | −5 | −5 | −7 | −7 |
| Lasalocid A | 12 | −7 | 0.19 | 0.20 | 5 | 3 | 2 | 9 |
| Levamisole | 28 | −59 | 0.37 | 0.36 | −2 | −3 | −2 | −1 |
| Lincomycin | 10 | −13 | 0.11 | 0.11 | −2 | −3 | −1 | 2 |
| Mebendazole | 6 | −66 | 0.21 | 0.24 | 17 | 20 | 14 | 8 |
| Melengestrol Acetate | 8 | −64 | 0.82 | 0.95 | 16 | 13 | 16 | 13 |
| Meloxicam | 2 | −48 | 0.41 | 0.41 | 1 | 1 | 0 | 0 |
| Metamizole | 14 | 129 | 0.56 | 0.43 | −23 | −20 | −26 | −27 |
| Metronidazole | 32 | −50 | 0.48 | 0.48 | 0 | 3 | 0 | −2 |
| Morantel | 7 | −69 | 0.86 | 0.86 | −1 | −2 | 0 | 0 |
| Nafcillin | 8 | −66 | 0.54 | 0.55 | 0 | −1 | 2 | −2 |
| Nitroxynil | 22 | 47 | 0.38 | 0.38 | 0 | 0 | −1 | 1 |
| Norfloxacin | 10 | −7 | 0.81 | 1.11 | 37 | 30 | 47 | 38 |
| Novobiocin | 9 | −69 | 0.89 | 0.90 | 0 | 1 | 2 | −1 |
| Orbifloxacin | 3 | −41 | 0.88 | 0.86 | −1 | −2 | −1 | −1 |
| Oxacillin | 12 | −68 | 0.94 | 0.94 | −1 | 2 | −1 | 2 |
| Oxfendazole | 6 | −54 | 0.97 | 0.97 | 0 | −1 | −1 | 0 |
| Oxyclozanide | 21 | 30 | 0.52 | 0.54 | 4 | 4 | −1 | 5 |
| Oxyphenylbutazone | 11 | −62 | 0.38 | 0.38 | −2 | −2 | −3 | −3 |
| Oxytetracycline | 9 | 64 | 0.38 | 0.39 | 3 | 2 | 3 | 2 |
| Phenylbutazone | 10 | −53 | 0.31 | 0.33 | 6 | 5 | 5 | 2 |
| Pirlimycin | 18 | −8 | 0.38 | 0.38 | 1 | −1 | 2 | 2 |
| Prednisone | 13 | −65 | 0.19 | 0.09 | −52 | −55 | −52 | −43 |
| Promethazine | 6 | −51 | 0.58 | 0.57 | 0 | 1 | 0 | −1 |
| Propionylpromazine | 13 | −47 | 0.88 | 0.72 | −18 | −12 | −28 | −29 |
| Ractopamine | 9 | −53 | 0.80 | 0.98 | 22 | 24 | 17 | 10 |
| Rafoxanide | 19 | −11 | 0.27 | 0.27 | 1 | 4 | −1 | −2 |
| Ronidazole | 31 | −48 | 0.29 | 0.43 | 47 | 49 | 39 | 14 |
| Salbutamol | 12 | −51 | 0.52 | 0.68 | 29 | 32 | 24 | 11 |
| Sarafloxacin | 6 | −85 | 0.95 | 1.37 | 45 | 37 | 54 | 41 |
| Sulfachloropyridazine | 8 | −64 | 0.54 | 0.54 | 1 | 2 | 1 | 1 |
| Sulfadiazin | 5 | −59 | 0.96 | 0.95 | −1 | −2 | −1 | −2 |
| Sulfadimethoxine | 2 | −49 | 0.46 | 0.46 | 0 | 0 | 0 | −1 |
| Sulfaethoxypyridazine | 6 | −55 | 0.86 | 0.86 | 0 | 0 | 0 | 0 |
| Sulfamerazine | 3 | −56 | 0.95 | 0.94 | 0 | 1 | −1 | 0 |
| Sulfamethazine | 5 | −51 | 0.24 | 0.24 | −2 | −3 | −3 | 0 |
| Sulfamethizole | 6 | −67 | 0.92 | 0.92 | −1 | −1 | −1 | 0 |

TABLE 3-continued

| | | | | | | | | |
|---|---|---|---|---|---|---|---|---|
| Sulfamethoxazole | 7 | −61 | 0.94 | 0.93 | −1 | 0 | −2 | −1 |
| Sulfamethoxypyridazine | 6 | −55 | 0.76 | 0.75 | 0 | −1 | 0 | 0 |
| Sulfanitran | 7 | −44 | 0.33 | 0.34 | 1 | 1 | 0 | 2 |
| Sulfapyridine | 2 | −55 | 0.99 | 0.97 | −3 | −3 | −1 | −2 |
| Sulfaquinoxaline | 6 | −65 | 0.60 | 0.59 | −2 | −4 | −1 | 0 |
| Sulfathiazole | 3 | −59 | 0.61 | 0.63 | 3 | 2 | 2 | 3 |
| Tetracycline | 7 | 111 | 0.38 | 0.38 | 1 | 0 | 0 | 2 |
| Thiabendazole | 6 | −42 | 0.71 | 0.72 | 1 | 2 | 0 | 1 |
| Thiamphenicol | 5 | 30 | 0.99 | 0.98 | −1 | 6 | −2 | −5 |
| Tildipirosin | 15 | 289 | 0.16 | 0.15 | −6 | −6 | −6 | −8 |
| Tilmicosin | 8 | −45 | 0.33 | 0.34 | 2 | 3 | 2 | 0 |
| Tolfenamic acid | 24 | −80 | 0.21 | 0.13 | −40 | −37 | −43 | −35 |
| Triclabendazole | 21 | −81 | 0.86 | 0.84 | −2 | −3 | −4 | 2 |
| Triclabendazole Sulfoxide | 12 | −83 | 0.53 | 0.19 | −64 | −67 | −63 | −47 |
| Trifluropromazine | 14 | −45 | 0.27 | 0.26 | −3 | −4 | 2 | −2 |
| Tulathromycin | 20 | 144 | 0.30 | 0.30 | 0 | −2 | 1 | 3 |
| Tylosin | 9 | −44 | 0.50 | 0.50 | 1 | 1 | 1 | 2 |
| Virginiamycin | 7 | −25 | 0.33 | 0.28 | −17 | −16 | −17 | −9 |
| Xylazine | 4 | −65 | 0.34 | 0.41 | 18 | 22 | 13 | 7 |

Materials and Supplies.

LC/MS-grade methanol (MeOH), acetonitrile (MeCN), and water were purchased from Fisher Scientific (Mississauga, ON, Canada). Ammonium fluoride, polyacrylonitrile (PAN), HPLC grade Acetone, and Dimethyl Sulfoxide (DMSO) were purchased from Sigma Aldrich (Oakville, ON, Canada). Stainless steel blades were purchased from Shimifrez Incorporated (Concord, ON, CAN). The blades were first coated with a 20 mm layer of biocompatible PAN and then coated with a slurry of PAN and Hydrophilic-Lipophilic Balanced (HLB) particles. Nunc U96 600 µL, 1 mL deep, and 2 mL well-plates made of polypropylene were purchased from VWR International (Mississauga, ON, Canada). Individual stock standard solutions were prepared in either MeCN, MeOH, water, or 10% DMSO in MeCN, in accordance with the solubility of each compound, and stored at −80° C. Organic beef muscle tissue samples were acquired from three different local grocery stores to serve as a pooled matrix.

The HLB particles (~5 µm diameter) were synthesized in house and characterized as described in Khaled, A.; Gionfriddo, E.; Acquaro, V.; Singh, V.; Pawliszyn, J. Development and Validation of a Fully Automated Solid Phase Microextraction High Throughput Method for Quantitative Analysis of Multiresidue Veterinary Drugs in Chicken Tissue. *Anal. Chim. Acta* 2019, 1056, 34-46, which is incorporated herein by reference.

The procedure used to coat the CBS devices is described in Augusto Gómez-Rios, G.; Tascon, M.; Reyes-Garcés, N.; Boyaci, E.; Poole, J.; Pawliszyn, J. Quantitative Analysis of Biofluid Spots by Coated Blade Spray Mass Spectrometry, a New Approach to Rapid Screening *Sci Rep* 7, 16104 (2017), which is incorporated herein by reference. The extraction phase coating length was 10 mm, and the thickness was 10 µm.

Sample Preparation.

Utilizing a Freezer/Mill® Cryogenic Grinder (SPEX SamplePrep, LLC, Metuchen, NJ, USA), beef tissue samples were homogenized and mixed in equal portions under liquid nitrogen to produce a uniform fine powder. Homogenized samples were stored in glass jars at −80° C. until analysis. Spiked tissue samples were prepared by weighing 2.0 g of homogenized tissue that had been brought to room temperature into a 50 mL polypropylene (PP) tube. Each sample was then spiked with 100 µL of a working solution containing all analytes under study at their respective designated concentrations, and 60 µL of the IS working solution containing 1 ng µL$^{-1}$ of each IS. Samples were vortexed for 1 min, then placed on a benchtop agitator for 1 h. Subsequently, samples were stored in a 4° C. fridge overnight so as to allow for equilibration and matrix binding of target analytes prior to extraction. Prior to extraction, samples were placed on the benchtop agitator for 1 h so as to allow samples to reach room temperature. Next, 6 mL of water were added to each individual spiked tissue sample and vortexed for 1 min in order to attain homogeneous consistency suitable for pipetting of samples to the wells of the 96 well-plates. 1500 µL of diluted beef sample was then transferred to each well of the 96 well-plate.

Analytical Protocols.

The CBS analytical workflow included four steps: (1) conditioning of the blades with MeOH:H$_2$O (50:50, v/v/), (2) extraction of target analytes from the matrix prepared as described above; (3) rinsing of coating with 15:85 acetone:H$_2$O to remove fatty residue, salts, or loose debris from the blade; (4) analyte desorption and ionization, whereby 12 µL of MeOH:MeCN:H$_2$O (80:15:5, v/v/v) with 5 mM ammonium fluoride was pipetted onto the coating of individual blades as they were placed in front of the MS inlet.

The authors of the present disclosure observed that negative mode does not drive the elution/ionization solvent to the tip of the blade. To achieve a stable spray in negative ionization mode and ensure reproducible results, the tip of the blade should be wetted with the elution/ionization solvent prior to applying the voltage. The addition of a small concentration of ammonium fluoride (such as 5 mM) to the elution/ionization solvent increase ionization efficiency in negative ionization mode. The enhanced ionization may be explained by the strong electronegativity of the fluoride ion, which enhances deprotonation in negative mode.

Steps 1-3 were automated with the use of a Concept-96 system (Professional Analytical Systems (PAS) Technology, Magdala, Germany), as described in Vuckovic, D.; Cudjoe, E.; Musteata, F. M.; Pawliszyn, J. Automated Solid-Phase Microextraction and Thin-Film Microextraction for High-Throughput Analysis of Biological Fluids and Ligand-Receptor Binding Studies. *Nat. Protoc.* 2010, 5 (1), 140-161, which is incorporated herein by reference.

Analytical parameters such as extraction time, desorption solvent and time, and rinsing solvent and time were investigated for optimum S/N ratio rather than signal only, as discussed in Gómez-Rios, G. A.; Mirabelli, M. F. Solid Phase Microextraction-Mass Spectrometry: Metanoia. *TrAC Trends Anal. Chem.* 2019, 112, 201-211.

Instruments and Conditions.

Analysis was carried out on a TSQ Quantiva from Thermo Scientific (San Jose, CA, USA) with data analysis completed using TraceFinder 4.1, also from Thermo Scientific. Desorption and ionization experiments were performed using a custom CBS interface as described in Gómez-Rios, G. A.; Pawliszyn, J. Development of Coated Blade Spray Ionization Mass Spectrometry for the Quantitation of Target Analytes Present in Complex Matrices. *Angew. Chemie—Int. Ed.* 2014, 53 (52), 14503-14507.

After 10s of analyte desorption/elution with the desorption solvent mentioned above, analyses were performed in negative ionization mode at minus 3.8 kV voltage for the first 10s of the analytical run, followed by 27s in positive mode at a plus 5 kV voltage, whereupon an electrospray event was produced at the tip of the blade, directly introducing the eluted analytes into the MS.

Two single reaction monitoring (SRM) transitions were used for each analyte, one for quantitation and one for confirmation, whereas only one transition was needed for each IS. MS/MS analyte transitions and conditions were optimized via direct infusion from methanolic and acetonitrile standards. The transitions (shown in Table 2) were selected based on the optimal S/N at a 1 MRL concentration level in beef matrix. Detailed information regarding optimized instrumental parameters (collision energy and RF-lens values) and monitored SRM transitions can be found in Table 2. The SRM dwell time was set at 5 ms per transition. Transfer line temperature was set to 300° C.

Matrix Effects.

The occurrence of matrix effects is undoubtedly a major drawback of ESI due to co-eluting matrix interferences and ionization competition. In the absence of chromatographic separation, matrix effects become even more pronounced, especially when more than 100 extracted analytes are ionized simultaneously.

In this study, matrix effects were examined by comparing the slopes of matrix-matched calibration curves and reagent-only calibration curves via the following equation: ME %=(slope of matrix-matched calibration curve–slope of reagent-only calibration curve)×100%/slope of reagent-only calibration curve. For matrix effects evaluation, matrix matched samples in the range of 0.5-3× were prepared by blotting the proper amount of calibration solutions on blades that were exposed to the blank matrix as per the analytical procedure described above, while reagent-only samples were prepared using the same procedure but using water as a matrix instead of beef. For the matrix effects calibration curves, the amount of analyte spotted on the blade was determined by comparing and approximating to the signal produced at its respective MRL value.

Figure 7:
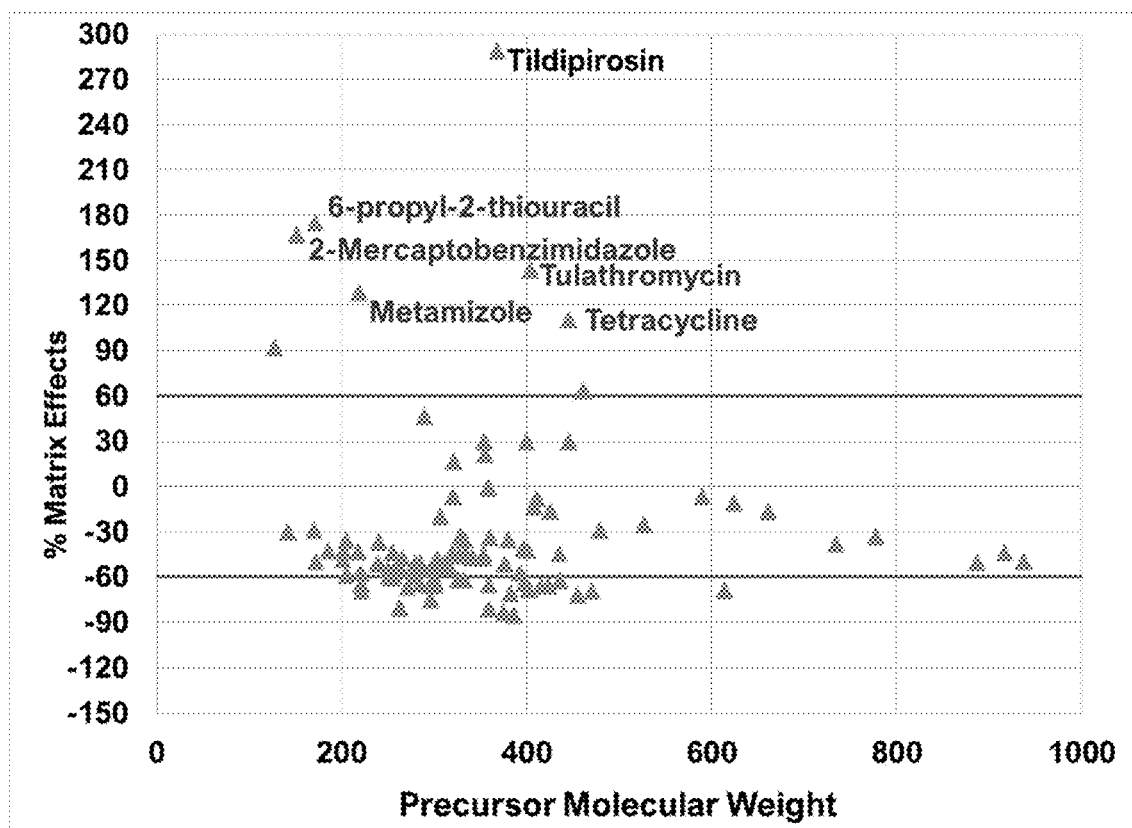
FIG. 7 is a graph summarizing matrix effects for the analytes studied versus their precursor molecular weight.

FIG. 7 shows the matrix effects for the analytes studied versus their precursor molecular weight. In FIG. 7, % MEs of selected drug analytes in beef tissue are plotted vs. their precursor molecular weight. Points above or below the red lines indicate % MEs±60%. Compounds that underwent suppression or enhancement by more than 100% are labeled. Internal standard correction was not used when evaluating matrix effects. While there is no reference or golden standard to compare these results to, they are somewhat comparable to what is usually attained with LC-MS/MS methods using conventional sample preparation techniques.

As shown in FIG. 7, and Table 3, while most of the analytes underwent signal suppression, signal suppression or enhancement for the majority of analytes (69%) was less than 60%, which the authors of the present disclosure consider remarkable in the absence of chromatographic separation given that more than 100 analytes are being ionized simultaneously. This promising outcome is not surprising due to the biocompatible nature of the SPME coating used in the CBS devices and its ability to simultaneously isolate and enrich a wide variety of analytes with minimal co-extraction of proteins, lipids, salts, and other matrix macromolecules present in the matrix.

In addition, optimizing the extraction time based on S/N has proven again that shorter extraction times minimize the unnecessary coextraction of undesired molecules that may cause higher noise or ionization suppression, without compromising detection limits. With that said, matrix effects in direct-to-MS methods cannot be eliminated entirely. However, they can be reduced and/or compensated for by using matrix matched calibration curves and labeled isotopic internal standards with structural analogues that mimic the analytes of interest. The ideal internal standard for any analyte is a stable isotope labeled form of said analyte. However, due to the large number of analytes included in this study, this approach is not practical. A more practical approach is to use one class specific internal standard for each class of drugs, especially for analytes that exhibited significant matrix effects.

Selectivity.

One potential drawback of direct-to-MS techniques is the lack of retention time, a factor that might lead to selectivity issues. Selectivity, which is the ability of a method to discriminate between the analyte of interest and closely related matrix components is an important consideration for identification of analytes in regulatory methods. In the absence of retention time, another criterion that can be used for identification of target analytes is the ion ratio between the quantifying and qualifying ion transition signals. However, there is a concern that ion ratios might be affected by interfering matrix components. Matrix components in challenging matrices might interfere with either the qualifying ion or the quantifying ion, resulting in a significant deviation in ion ratios which can negatively impact qualitative outcome. Criteria for acceptable ion ratio deviations from the expected ion ratio vary depending on the country. However, a recent study by Berendsen et al. (Critical Assessment of the Performance Criteria in Confirmatory Analysis for Veterinary Drug Residue Analysis Using Mass Spectrometric Detection in Selected Reaction Monitoring Mode. *Drug Test. Anal.* 2016, 8 (5-6), 477-490.) recommended a fixed ion ratio deviation tolerance of ±50% for veterinary drugs in challenging matrices such as animal tissue to minimize false negative findings.

To study the influence of matrix components on ion ratio behavior, the data obtained from the matrix-matched calibration and reagent-only calibration, as described in the matrix effects section above, was used to calculate ion ratios in both matrix and reagent-only samples. Ion ratios were calculated by dividing the area of the less intense ion by the by the area of the higher intensity ion to ensure that the ion ratio was less than 1, although for certain analytes, the less intense ion was used for quantitative purposes, due to better S/N in the sample matrix. The reference ion ratio for each analyte was calculated as the average ratio obtained from all concentrations of the reagent-only calibration standards in the same sequence as the matrix calibration standards. The average matrix ion ratio for each analyte was the average ratio obtained from all concentrations of the matrix calibration standards. The relative deviation of matrix ion ratios from the corresponding reference ion ratios, in percent, was calculated by subtracting the reference ion ratio from each of the average matrix ion ratio and then dividing by the reference ion ratio.

The majority of analytes (71%) exhibited relative ion ratio deviation values that were within ±10% of the reference ion ratio value. Only 9% of the analytes exhibited relative ion ratio deviation values that fell outside the ±50% level proposed by Berendsen at al.

The extent of ion ratio variability in the matrix was also assessed at three different concentrations (0.75×, 1×, and 1.5×). The trend of variation was mostly independent on the concentrations except for four analytes, namely 6-phenyl thiouracil, cefazolin diclofenac, and emamectin. Individual ion ratio deviation values for each analytes at each concentration are shown in Table 3. Higher deviations for these compounds were mainly due to the presence of matrix components that interfere with qualifier ions that have low S/N range (<10). One particular compound, 6-phenyl thiouracil, displayed a significantly high relative ion ratio deviation (average 403%) due to a significant matrix interference with the qualifier ion transition (205→188). It is also worth noting that this transition is a neutral loss which is not favored for selectivity purposes. This observation further validates recommendations by Berendsen et al. to avoid neutral losses of 17 and 18 Da for proper identification of target analytes.

Linearity and Limits of Quantitation.

Matrix-matched calibration curves were used to assess linearity and limits of quantitation. Calibration functions were constructed on the basis of the signal ratio of the analyte and IS (A/Is) for 7 concentration levels (from 0.25-2.5×) in three independent replicates. The calibration range was selected to include concentration levels bracketing the MRL. Despite the use of only one internal standard per ionization mode for correction for all the analytes, the majority of the target analytes (55%) achieved $R^2$ values higher than 0.99, while the other 45% achieved $R^2$ values between 0.95 and 0.99. While most analytes exhibited excellent linearity results, the suboptimal linearity results for the remaining analytes could be attributed to inappropriate internal standard correction or low detectability due to suboptimal coating chemistry or inappropriate desorption solvent.

LOQ was established as the lowest point of the matrix-matched calibration curve that produced a response that is both accurate when compared to the expected value (calculated via linear regression), within a 70-120% range of the true concentrations, as well as precise (≤25% RSD). As shown in Table 3, all analytes under study achieved low enough LOQs to ensure proper determination at the maximum residue levels set in Canada and the US. Individual determination coefficients and LOQ values for all compounds under study are listed in Table 3.

Accuracy and Precision.

To evaluate the accuracy and precision of the method with respect to intra-day repeatability, pooled matrix blanks were spiked at three validation levels; low, mid, and high (0.4×, 0.75× and 1.5×) for each analyte, using six replicates per concentration (n=6). Accuracy was calculated based on estimated concentration values calculated from the linear regression equation of the matrix-matched calibration curve.

As presented in Table 3, the majority of the analytes fell within a 70-120% range of the true concentrations of compounds, and yielded RSDs of 25% at the 0.4, 0.75 and 1.5× concentration levels, thus confirming that they can be quantitatively determined. Individual accuracy and % RSD values are listed on Table 3 for each analyte under study.

In the preceding description, for purposes of explanation, numerous details are set forth in order to provide a thorough understanding of the examples. However, it will be apparent to one skilled in the art that these specific details are not required. Accordingly, what has been described is merely illustrative of the application of the described examples and numerous modifications and variations are possible in light of the above teachings.

Since the above description provides examples, it will be appreciated that modifications and variations can be effected to the particular examples by those of skill in the art. Accordingly, the scope of the claims should not be limited by the particular examples set forth herein, but should be construed in a manner consistent with the specification as a whole.

What is claimed is:

1. A device for extracting a molecule of interest from a sample matrix, the device comprising:
    a support comprising a previously etched stainless-steel support surface, and comprising an insertion end and a mounting end;
    a sealing layer that at least partially coats the stainless-steel support surface from the insertion end towards the mounting end leaving a portion of the support surface uncoated at the mounting end, wherein the sealing layer consists of a layer of polyacrylonitrile (PAN); and
    an extractive phase coating applied to a portion of the sealing layer leaving only a portion of the sealing layer extending past the end of the extractive phase coating, allowing the extractive phase coating to be fully immersed in the sample matrix while preventing the uncoated stainless-steel support surface from coming in contact with the sample matrix.

2. The extraction device according to claim 1, wherein the sealing layer has an average thickness of 0.5 to 5 µm.

3. The extraction device according to claim 1, wherein the extractive phase coating layer comprises a biocompatible polymer.

4. The extraction device according to claim 3, wherein the extractive phase coating layer comprises a sorptive material immobilized in polyacrylonitrile (PAN).

5. The extraction device according to claim 1, wherein the support is in the shape of a blade.

6. The extraction device according to claim 1, wherein the extractive phase coating adheres to the sealing layer better than the extractive phase coating would adhere to a previously etched stainless-steel support surface that lacked the sealing layer.

7. The extraction device according to claim 1, wherein the sample is a biological tissue sample.

8. A high-throughput screening device comprising a plurality of extraction devices according to claim 1.

9. The high-throughput screening device according to claim 8, wherein the extraction devices comprise an extractive coating that is 60 µm thick and is 2 cm in length.

10. The high-throughput screening device according to claim 9, wherein the relative standard deviation (RSD) of the thickness of the extractive coating is less than 10%; and wherein the relative standard deviation (RSD) of the length of the extractive coating is less than 10%.

11. A device for extracting a molecule of interest from a sample matrix, the device comprising:
    a support comprising a support surface, and comprising an insertion end and a mounting end;
    a sealing layer that at least partially coats the support surface from the insertion end towards the mounting end leaving a portion of the support surface uncoated at the mounting end, wherein the sealing layer consists of a layer of polyacrylonitrile (PAN); and an extractive phase coating applied to a portion of the sealing layer leaving a portion of only the sealing layer extending past the end of the extractive phase coating, allowing the coating to be fully immersed in the sample matrix while preventing the uncoated stainless-steel support surface from coming in contact with the sample matrix, wherein the extractive phase coating is adapted to contain the molecule of interest.

12. The extraction device according to claim 11, wherein the support surface is a metal support surface.

13. The extraction device according to claim 12, wherein the support surface is stainless-steel etched by immersion in an aqueous sodium chloride solution under application of a voltage.

14. The extraction device according to claim 13, wherein the applied voltage is 3.5 V.

15. The extraction device according to claim 11, wherein the portion of only the sealing layer extends at least 5 mm past the end of the extractive phase coating.

16. The extraction device according to claim 11, wherein the area of the support surface covered by only the sealing layer is at least 10% greater than the area covered by the extractive phase coating.

17. The extraction device according to claim 16, wherein the area of the support surface covered by only the sealing layer is 25%, 50%, 75%, 100%, 150%, 200%, or more than 200% greater than the area covered by the extractive phase coating.

18. The extraction device according to claim 11, wherein the support includes one or more edges for spray ionization.

19. The extraction device according to claim 11, wherein the support comprises a substantially edgeless member.

* * * * *